United States Patent
Kawamura

(10) Patent No.: US 11,020,885 B2
(45) Date of Patent: Jun. 1, 2021

(54) POLYPROPYLENE-BASED FOAMED MOLDED BODY AND MANUFACTURING METHOD OF POLYPROPYLENE-BASED FOAMED MOLDED BODY

(71) Applicant: PRIME POLYMER CO., LTD., Tokyo (JP)

(72) Inventor: Tatsuji Kawamura, Ichihara (JP)

(73) Assignee: PRIME POLYMER CO., LTD., Tokyo (JP)

( * ) Notice: Subject to any disclaimer, the term of this patent is extended or adjusted under 35 U.S.C. 154(b) by 404 days.

(21) Appl. No.: 15/522,684

(22) PCT Filed: Oct. 28, 2015

(86) PCT No.: PCT/JP2015/080325
§ 371 (c)(1),
(2) Date: Apr. 27, 2017

(87) PCT Pub. No.: WO2016/068164
PCT Pub. Date: May 6, 2016

(65) Prior Publication Data
US 2017/0312951 A1    Nov. 2, 2017

(30) Foreign Application Priority Data
Oct. 30, 2014   (JP) .............................. JP2014-221651

(51) Int. Cl.
*B32B 7/02*   (2019.01)
*B29C 44/02*   (2006.01)
(Continued)

(52) U.S. Cl.
CPC ............ *B29C 44/02* (2013.01); *B29C 44/586* (2013.01); *B29C 45/00* (2013.01); *B29C 45/78* (2013.01);
(Continued)

(58) Field of Classification Search
CPC ....... B29C 44/586; B29C 44/04; B29C 44/08; B29C 44/0407; B29C 44/083; B32B 5/18;
(Continued)

(56) References Cited

U.S. PATENT DOCUMENTS

| 7,195,815 B1 | 3/2007 | Harada et al. |
| 7,833,445 B2 | 11/2010 | Harada et al. |

(Continued)

FOREIGN PATENT DOCUMENTS

| JP | S53-064257 A | 6/1978 |
| JP | S58-168649 A | 10/1983 |

(Continued)

OTHER PUBLICATIONS

Japanese Office Action dated May 22, 2018 in corresponding application No. 2016-556591.
(Continued)

*Primary Examiner* — Zachary M Davis
(74) *Attorney, Agent, or Firm* — Foley & Lardner LLP

(57) ABSTRACT

In a polypropylene-based foamed molded body of the present invention, a density which is measured on the basis of ISO1183 is greater than or equal to 0.15 g/cm$^3$ and less than or equal to 0.54 g/cm$^3$, thermal resistance (R) at 30° C. in a thickness direction which is measured on the basis of ASTM E1530 is greater than or equal to 0.020 m$^2$·K/W and less than or equal to 0.125 m$^2$·K/W, thermal capacity per unit area (Q) at 30° C. is greater than or equal to 1.0 kJ/m$^2$·K and less than or equal to 2.5 kJ/m$^2$·K, and Expression 1 described below is satisfied.

$$Q > 1/(4 \times R^{1/2})$$   (Expression 1)

15 Claims, 1 Drawing Sheet

(51) Int. Cl.
  *B29C 45/78*  (2006.01)
  *C08J 9/08*  (2006.01)
  *B29C 45/00*  (2006.01)
  *B29C 44/58*  (2006.01)
  *C08L 53/00*  (2006.01)
  *C08F 297/08*  (2006.01)
  *C08J 9/00*  (2006.01)
  *B29L 31/30*  (2006.01)
  *B29C 44/34*  (2006.01)
  *B29K 23/00*  (2006.01)
  *B29K 105/04*  (2006.01)

(52) U.S. Cl.
  CPC ......... *C08F 297/083* (2013.01); *C08J 9/0061* (2013.01); *C08J 9/0066* (2013.01); *C08J 9/08* (2013.01); *C08L 53/00* (2013.01); *B29C 44/3415* (2013.01); *B29K 2023/12* (2013.01); *B29K 2105/04* (2013.01); *B29K 2995/0013* (2013.01); *B29K 2995/0015* (2013.01); *B29K 2995/0063* (2013.01); *B29K 2995/0097* (2013.01); *B29L 2031/3014* (2013.01); *B29L 2031/3055* (2013.01); *C08J 2203/02* (2013.01); *C08J 2203/10* (2013.01); *C08J 2205/10* (2013.01); *C08J 2353/00* (2013.01); *C08J 2423/08* (2013.01)

(58) Field of Classification Search
  CPC . B32B 5/20; C08L 23/10; C08L 23/14; C08L 23/142
  See application file for complete search history.

(56) References Cited

U.S. PATENT DOCUMENTS

| | | |
|---|---|---|
| 2005/0179158 A1 | 8/2005 | Harada et al. |
| 2005/0181085 A1 | 8/2005 | Harada et al. |
| 2006/0135672 A1 | 6/2006 | Kanzaki |
| 2010/0201016 A1* | 8/2010 | Kawamura ........... C08F 297/08 264/54 |
| 2010/0298456 A1 | 11/2010 | Nakajima et al. |
| 2011/0206922 A1 | 8/2011 | Kawamura et al. |
| 2014/0011937 A1 | 1/2014 | Nagata et al. |

FOREIGN PATENT DOCUMENTS

| | | |
|---|---|---|
| JP | H10-298366 A | 11/1998 |
| JP | 2001-088235 A | 4/2001 |
| JP | 2010-150509 A | 7/2010 |

OTHER PUBLICATIONS

Extended European Search Report dated Jul. 10, 2018 in corresponding application No. 15853865.2.

English-Language Translation of International Search Report for International Patent Application No. PCT/JP2015/080325 dated Jan. 12, 2016.

* cited by examiner

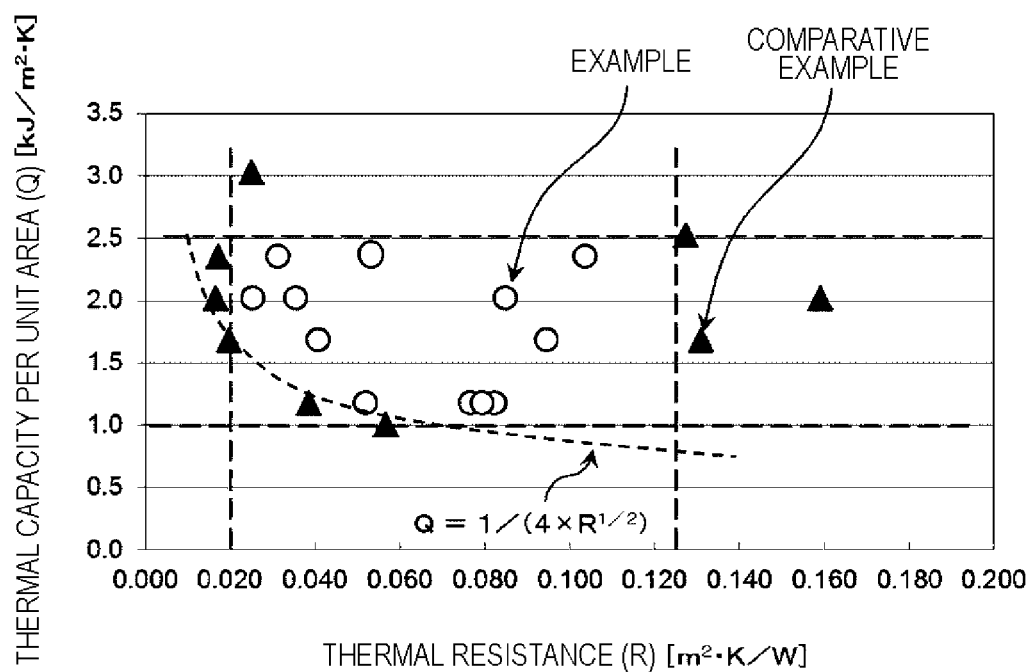

POLYPROPYLENE-BASED FOAMED MOLDED BODY AND MANUFACTURING METHOD OF POLYPROPYLENE-BASED FOAMED MOLDED BODY

CROSS-REFERENCE TO RELATED APPLICATIONS

The present application is a U.S. national stage entry of International Patent Application No. PCT/JP2015/080325 filed on Oct. 28, 2015, which claims priority to Japanese Patent Application No. 2014-221651 filed on Oct. 30, 2014, the entire contents of which are incorporated herein by reference.

TECHNICAL FIELD

The present invention relates to a polypropylene-based foamed molded body and a manufacturing method of a polypropylene-based foamed molded body.

BACKGROUND ART

Recently, an interior component of an automobile has been required to be light from the viewpoint of environmental problems or improvement of fuel efficiency.

Currently, a foamed molded body starts to be used in the interior component of the automobile as a unit for making lightweight and rigidity compatible.

Examples of a technology relevant to the foamed molded body include a technology described in Patent Document 1. In Patent Document 1 (Japanese Laid-open Patent Publication No. 2001-088235), a thermoplastic resin porous body is described in which three layers of a surface layer portion, a foamed inner layer portion, and a surface layer portion are integrally molded.

In Patent Document 1, it is described that such a thermoplastic resin porous body has high compressive rigidity and high bending rigidity in a thickness direction, and is light.

RELATED DOCUMENT

Patent Document

[Patent Document 1] Japanese Laid-open Patent Publication No. 2001-088235

SUMMARY OF THE INVENTION

However, according to studies of the present inventors, it is obvious that a wall of an air bubble cell in the foamed molded body as described in Patent Document 1 is thin, and thus, in a case where a load is applied on the wall and the wall is deformed, the wall of the air bubble cell easily buckles, and thus, it is not possible to use the foamed molded body as the interior component of the automobile.

Here, a loss due to heat storage of interior thermal energy of the automobile in the interior component and a loss due to heat movement through the interior component are also considered as one reason for fuel efficiency deterioration of the automobile. For this reason, in order to reduce a loss of thermal energy, an interior component having a low heat storage amount, high thermal resistance, and a light weight is required.

According to the studies of the present inventors, in the foamed molded body as described in Patent Document 1, it is obvious that gas convection or heat radiation is easily performed in the wall of the air bubble cell, and thus, a heat insulating effect also decreases.

The present invention has been made in consideration of the circumstances described above, and an object of the present invention is to provide a polypropylene-based foamed molded body from which an interior component of an automobile having an excellent balance in lightness, rigidity, and an appearance, a low heat storage amount, and high thermal resistance can be realized.

The present inventors have conducted intensive studies in order to realize an interior component of an automobile having an excellent balance in lightness, rigidity, and an appearance, a low heat storage amount, and high thermal resistance. As a result thereof, when thermal resistance (R) in a thickness direction and thermal capacity per unit area (Q) are in a specific range and have a specific relationship, it has been found that an excellent balance in the performances described above is obtained for the first time, and thus, the present invention has been completed.

According to the present invention, a polypropylene-based foamed molded body and a manufacturing method of a polypropylene-based foamed molded body described below are provided.

[1]

A polypropylene-based foamed molded body, in which a density which is measured on the basis of ISO1183 is greater than or equal to 0.15 g/cm$^3$ and less than or equal to 0.54 g/cm$^3$, thermal resistance (R) at 30° C. in a thickness direction which is measured on the basis of ASTM E1530 is greater than or equal to 0.020 m$^2$·K/W and less than or equal to 0.125 m$^2$·K/W, thermal capacity per unit area (Q) at 30° C. is greater than or equal to 1.0 kJ/m$^2$·K and less than or equal to 2.5 kJ/m$^2$·K, and Expression 1 described below is satisfied.

$$Q > 1/(4 \times R^{1/2}) \quad \text{(Expression 1)}$$

[2]

The polypropylene-based foamed molded body according to [1] described above, in which a substantial thickness ($t_0$) of the polypropylene-based foamed molded body which is defined by Expression 2 described below is greater than or equal to 0.7 mm and less than 1.5 mm.

$$t_0 \text{ (mm)} = 10 \times W/(D_0 \times S) \quad \text{(Expression 2)}$$

(In Expression 2 described above, W indicates a mass (g) of a plate-like foamless test piece which is defoamed and is obtained by defoaming a square plate-like test piece cut out from the polypropylene-based foamed molded body at 200° C. under reduced pressure, and then, by performing a pressurized slow cooling treatment. $D_0$ indicates a density (g/cm$^3$) of the obtained foamless test piece. S indicates an area (cm$^2$) of one surface of the square plate-like test piece cut out from the polypropylene-based foamed molded body.)

[3]

The polypropylene-based foamed molded body according to [1] or [2] described above, in which at least a part of the polypropylene-based foamed molded body includes a flat portion, and bending rigidity per unit width in the flat portion is greater than or equal to 0.40 N·m$^2$/m.

[4]

The polypropylene-based foamed molded body according to any one of [1] to [3] described above, in which a first solid skin layer, a foamed layer, and a second solid skin layer are in a state of being laminated in this order.

[5]

The polypropylene-based foamed molded body according to [4] described above, in which a thickness of the polypropylene-based foamed molded body is greater than or equal to 2.0 mm and less than or equal to 7.0 mm, and thicknesses of the first solid skin layer and the second solid skin layer are respectively greater than or equal to 0.1 mm and less than or equal to 0.5 mm.

[6]

The polypropylene-based foamed molded body according to any one of [1] to [5] described above, in which the polypropylene-based foamed molded body contains a propylene•ethylene-based block copolymer (A) and ethylene•α-olefin copolymer rubber (B).

[7]

The polypropylene-based foamed molded body according to [6] described above, in which when a total of the propylene•ethylene-based block copolymer (A), the ethylene•α-olefin copolymer rubber (B), and an inorganic filler (C) is set to 100 parts by mass, a content of the propylene•ethylene-based block copolymer (A) is greater than or equal to 65 parts by mass and less than or equal to 90 parts by mass, a content of the ethylene•α-olefin copolymer rubber (B) is greater than or equal to 10 parts by mass and less than or equal to 30 parts by mass, and a content of the inorganic filler (C) is greater than or equal to 0 parts by mass and less than or equal to 5 parts by mass.

[8]

A manufacturing method for manufacturing the polypropylene-based foamed molded body according to any one of [1] to [7] described above, including: a step of performing foam molding with respect to a propylene-based resin composition containing a propylene•ethylene-based block copolymer (A), ethylene•α-olefin copolymer rubber (B), and an inorganic filler (C); and a step of further adding a foaming agent (D) to the polypropylene-based resin composition before performing the foam molding or at the time of performing the foam molding, in which when a total of the propylene•ethylene-based block copolymer (A), the ethylene•α-olefin copolymer rubber (B), and the inorganic filler (C) is set to 100 parts by mass, a formulation amount of the propylene•ethylene-based block copolymer (A) is greater than or equal to 65 parts by mass and less than or equal to 90 parts by mass, a formulation amount of the ethylene•α-olefin copolymer rubber (B) is greater than or equal to 10 parts by mass and less than or equal to 30 parts by mass, a formulation amount of the inorganic filler (C) is greater than or equal to 0 parts by mass and less than or equal to 5 parts by mass, and a formulation amount of the foaming agent (D) is greater than or equal to 0.8 parts by mass and less than or equal to 4.0 parts by mass.

[9]

The manufacturing method of a polypropylene-based foamed molded body according to [8] described above, in which a melt flow rate (MFR) (230° C., a load of 2160 g) of the propylene•ethylene-based block copolymer (A) which is measured on the basis of ASTM D-1238 is greater than or equal to 50 g/10 minutes and less than or equal to 140 g/10 minutes.

[10]

The manufacturing method of a polypropylene-based foamed molded body according to [8] or [9] described above, in which an inherent viscosity of an ethylene•propylene random copolymer portion configuring the propylene•ethylene-based block copolymer (A) which is measured at 135° C. in decahydronaphthalene is greater than 5 dl/g and less than or equal to 9 dl/g.

[11]

The manufacturing method of a polypropylene-based foamed molded body according to any one of [8] to [10] described above, in which the foaming agent (D) is a thermally decomposable foaming agent containing at least one type selected from carbonate and hydrogen carbonate.

[12]

The manufacturing method of a polypropylene-based foamed molded body according to any one of [8] to [11] described above, in which in the step of performing the foam molding with respect to the propylene-based resin composition, the polypropylene-based resin composition is subjected to injection foam molding by using an injection molding machine, and when a cavity clearance of a metal mold at the time of starting injection is set to $T_0$, and a length of a sectional surface of a cavity in an enlarging and opening direction after retracting a movable mold of the metal mold is set to $T_1$, $T_0$ is set to be greater than or equal to 0.7 mm and less than 1.5 mm, and $T_1/T_0$ is set to be greater than or equal to 1.8 and less than or equal to 6.0.

[13]

The manufacturing method of a polypropylene-based foamed molded body according to [12] described above, in which a temperature of the polypropylene-based resin composition at the time of performing the injection with respect to the polypropylene-based resin composition is higher than or equal to 170° C. and lower than or equal to 250° C., temperatures of a fixed mold and the movable mold of the metal mold at the time of performing the injection are higher than or equal to 25° C. and lower than or equal to 80° C., an injection rate of the injection molding machine is greater than or equal to 100 cm³/second and less than or equal to 2000 cm³/second, an injection pressure of the injection molding machine is greater than or equal to 70 MPa and less than or equal to 200 MPa, a time from completion of injection filling to start of retracting the movable mold is longer than 0 seconds and shorter than or equal to 5 seconds, and a foaming ratio is greater than or equal to 1.8 times and less than or equal to 6.0 times.

[14]

The manufacturing method of a polypropylene-based foamed molded body according to [12] or [13] described above, in which a heat insulating layer having thermal conductivity of greater than or equal to 0.18 W/m·K and less than or equal to 40 W/m·K is formed over one surface or both surfaces of the cavity of the metal mold to have a thickness of greater than or equal to 0.01 mm and less than or equal to 0.5 mm.

[15]

The polypropylene-based foamed molded body according to any one of [1] to [7] described above, in which the polypropylene-based foamed molded body is an interior component of an automobile.

[16]

The polypropylene-based foamed molded body according to [15] described above, in which the polypropylene-based foamed molded body is a door trim of the automobile.

According to the present invention, it is possible to provide a polypropylene-based foamed molded body from which an interior component of an automobile having an excellent balance in lightness, rigidity, and an appearance, a low heat storage amount, and high thermal resistance can be realized.

BRIEF DESCRIPTION OF THE DRAWINGS

The object described above, other objects thereof, and characteristics and advantages will be more obvious by preferred embodiments described below and the following drawings associated therewith.

FIG. 1 is a diagram in which thermal capacity per unit area (Q) and thermal resistance (R) of a polypropylene-based foamed molded body obtained in each example and each comparative example are plotted.

DESCRIPTION OF EMBODIMENTS

Hereinafter, embodiments of the present invention will be described. Furthermore, "to" between numerals in a sentence indicates that being greater than or equal to a numeral and less than or equal to a numeral, unless otherwise particularly stated.

[Polypropylene-Based Foamed Molded Body]

First, a polypropylene-based foamed molded body according to this embodiment will be described.

The polypropylene-based foamed molded body according to this embodiment is formed of a polypropylene-based resin composition, and is preferably obtained by performing injection foam molding with respect to the polypropylene-based resin composition described above by using an injection molding machine.

In the polypropylene-based foamed molded body according to this embodiment, a density measured on the basis of ISO1183 is greater than or equal to 0.15 g/cm$^3$ and less than or equal to 0.54 g/cm$^3$, is preferably greater than or equal to 0.20 g/cm$^3$ and less than or equal to 0.50 g/cm$^3$, is more preferably greater than or equal to 0.20 g/cm$^3$ and less than or equal to 0.40 g/cm$^3$, and is particularly preferably greater than or equal to 0.20 g/cm$^3$ and less than or equal to 0.30 g/cm$^3$.

In a case where the density described above is less than or equal to the upper limit value described above, it is possible to obtain a merit of the lightness of the polypropylene-based foamed molded body. In a case where the density described above is greater than or equal to the lower limit value described above, it is possible to improve the compressive strength or mechanical properties such as impact resistance of the polypropylene-based foamed molded body.

In addition, in the polypropylene-based foamed molded body according to this embodiment, thermal resistance (R) at 30° C. in a thickness direction which is measured on the basis of ASTM E1530 is greater than or equal to 0.020 m$^2$·K/W and less than or equal to 0.125 m$^2$·K/W, is preferably greater than or equal to 0.020 m$^2$·K/W and less than 0.110 m$^2$·K/W, and is more preferably greater than or equal to 0.050 m$^2$·K/W and less than or equal to 0.100 m$^2$·K/W.

In addition, in the polypropylene-based foamed molded body according to this embodiment, thermal capacity per unit area (Q) at 30° C. is greater than or equal to 1.0 kJ/m$^2$·K and less than or equal to 2.5 kJ/m$^2$·K, and is preferably greater than or equal to 1.0 kJ/m$^2$·K and less than or equal to 2.0 kJ/m$^2$·K.

Further, the polypropylene-based foamed molded body according to this embodiment satisfies Expression 1 described below, and preferably satisfies Expression 1' described below.

$$Q>1/(4\times R^{1/2}) \quad \text{(Expression 1)}$$

$$Q>1/(3\times R^{1/2}) \quad \text{(Expression 1')}$$

In the polypropylene-based foamed molded body according to this embodiment, it is particularly preferable that the thermal resistance (R) at 30° C. in the thickness direction which is measured on the basis of ASTM E1530 is greater than or equal to 0.050 m$^2$·K/W and less than or equal to 0.120 m$^2$·K/W, and the thermal capacity per unit area (Q) at 30° C. is greater than or equal to 1.15 kJ/m$^2$·K and less than or equal to 2.5 kJ/m$^2$·K. It is preferable that the polypropylene-based foamed molded body in this range since it is possible to further decrease the density while maintaining mechanical properties. Furthermore, in this embodiment, there is a case where the thermal capacity per unit area (Unit: kJ/m$^2$·K) is described as a heat storage amount per unit area (Unit: kJ/m$^2$·K).

As can be easily understood from examples described below, a cavity clearance of a metal mold at the time of starting injection, a foaming ratio at the time of performing foaming, a cavity material of the metal mold, and the like are suitably selected, and thus, it is possible to manufacture the polypropylene-based foamed molded body according to this embodiment satisfying such properties by using a propylene-based resin composition according to this embodiment without performing an excessive trial-and-error test.

FIG. 1 is a diagram in which the thermal capacity per unit area (Q) and the thermal resistance (R) of the polypropylene-based foamed molded body obtained in each example and each comparative example described below are plotted. The present inventors have newly found that in a case where the thermal capacity per unit area (Q) and the thermal resistance (R) are in a region illustrated in FIG. 1, it is possible to realize a polypropylene-based foamed molded body having an excellent balance in the lightness, the rigidity, and the appearance, a low heat storage amount, and high thermal resistance.

That is, according to this embodiment, when the thermal resistance (R) in the thickness direction and the thermal capacity per unit area (Q) are in a specific range and have a specific relationship, it is possible to realize the polypropylene-based foamed molded body having an excellent balance in the performances described above.

In the polypropylene-based foamed molded body according to this embodiment, it is preferable that a substantial thickness ($t_0$) of the molded body which is defined by Expression 2 described below is greater than or equal to 0.7 mm and less than 1.5 mm.

$$t_0 \text{ (mm)}=10\times W/(D_0\times S) \quad \text{(Expression 2)}$$

(In Expression 2 described above, W indicates a mass (g) of a plate-like foamless test piece which is defoamed and is obtained by defoaming a predetermined amount of square plate-like test piece cut out from the polypropylene-based foamed molded body at 200° C. under reduced pressure, and then, by performing a pressurized slow cooling treatment. $D_0$ indicates a density (g/cm$^3$) of the obtained foamless test piece described above. S indicates an area (cm$^2$) of one surface of the square plate-like test piece cut out from the polypropylene-based foamed molded body.)

The polypropylene-based foamed molded body having such a substantial thickness ($t_0$) further suppresses a heat storage amount to be low, and thus, is preferable from the viewpoint of enabling a thermal energy loss amount to be reduced.

In general, at least a part of the polypropylene-based foamed molded body according to this embodiment includes a flat portion or a three-dimensional curved surface portion.

Here, the three-dimensional curved surface portion is defined as a curved surface in which the maximum value of the total projection area of the curved surface with respect to the total area in a case of leveling the curved surface to be a flat surface is greater than or equal to 0.8, and is preferably greater than or equal to 0.7.

Then, in a case where at least a part of the polypropylene-based foamed molded body according to this embodiment includes a flat portion, bending rigidity per unit width in the flat portion described above is preferably greater than or equal to 0.40 N·m²/m, and is more preferably greater than or equal to 0.50 N·m²/m. In a case where the bending rigidity described above is greater than or equal to the lower limit value described above, it is possible to more preferably apply the polypropylene-based foamed molded body according to this embodiment to an interior component of an automobile.

In the polypropylene-based foamed molded body according to this embodiment, it is preferable that a first solid skin layer, a foamed layer, and a second solid skin layer are in a state of being laminated in this order, and it is more preferable that the first solid skin layer, the foamed layer, and the second solid skin layer are in the state of being laminated in this order, and the three layers are integrally molded.

Accordingly, the unfoamed solid skin layer is provided on the surface, and thus, it is possible to obtain a polypropylene-based foamed molded body having high rigidity.

In this embodiment, the first solid skin layer and the second solid skin layer are layers not including an air bubble cell, that is, unfoamed portions of a layer formed of a polypropylene-based resin composition. The foamed layer is a layer including an air bubble cell portion of which the thickness is generally greater than or equal to 5 µm, and is preferably greater than or equal to 20 µm in a case of observing the sectional surface thereof with a microscope.

In the polypropylene-based foamed molded body according to this embodiment, the total thickness of the polypropylene-based foamed molded body is not particularly limited, but is preferably greater than or equal to 2.0 mm and less than or equal to 7.0 mm. In addition, the thicknesses of the first solid skin layer described above and the second solid skin layer described above are not particularly limited, but are respectively preferably greater than or equal to 0.1 mm and less than or equal to 0.5 mm.

In the polypropylene-based foamed molded body, it is considered that the maximum tension or the maximum compressive force is applied on the skin layer of the surface layer by bending from the shape of the sectional surface thereof or deformation due to a force received on the surface. It is preferable that the thicknesses of the first solid skin layer described above and the second solid skin layer described above are respectively greater than or equal to 0.1 mm from the viewpoint of enduring bending or surface impact in which a force is received on the surface, and it is preferable that the thicknesses of the first solid skin layer and the second solid skin layer described above are respectively less than or equal to 0.5 mm from the viewpoint of decreasing the thermal capacity of the foamed molded body.

The polypropylene-based foamed molded body according to this embodiment can be preferably used in various applications such as interior and exterior components of an automobile, a substitute such as a corrugated board, an electric product, and a building material. In particular, the polypropylene-based foamed molded body according to this embodiment has an excellent balance in the lightness, the rigidity, and the appearance and excellent heat insulating properties, and thus, the polypropylene-based foamed molded body can be preferably used in the interior component of the automobile, and can be particularly preferably used a door trim of the automobile.

[Polypropylene-Based Resin Composition]

Subsequently, the polypropylene-based resin composition according to this embodiment will be described.

It is preferable that the polypropylene-based resin composition according to this embodiment contains a propylene•ethylene-based block copolymer (A), ethylene•α-olefin copolymer rubber (B), and as necessary, an inorganic filler (C), and it is desirable that a foaming agent (D) is added to the polypropylene-based resin composition from the middle of a hopper or a cylinder before performing foam molding with respect to the foamed molded body or at the time of performing the foam molding.

Then, when a total of the propylene•ethylene-based block copolymer (A), the ethylene•α-olefin copolymer rubber (B), and the inorganic filler (C) is set to 100 parts by mass, it is preferable that a formulation amount of the propylene•ethylene-based block copolymer (A) is greater than or equal to 65 parts by mass and less than or equal to 90 parts by mass, a formulation amount of the ethylene•α-olefin copolymer rubber (B) is greater than or equal to 10 parts by mass and less than or equal to 30 parts by mass, a formulation amount of the inorganic filler (C) is greater than or equal to 0 parts by mass and less than or equal to 5 parts by mass, and a formulation amount of the foaming agent (D) is greater than or equal to 0.8 parts by mass and less than or equal to 4.0 parts by mass.

In addition, in the polypropylene-based foamed molded body according to this embodiment, when the total of the polypropylene-based foamed molded body is set to 100 mass %, the total content of the propylene•ethylene-based block copolymer (A) described above, the ethylene•α-olefin copolymer rubber (B) described above, and the inorganic filler (C) described above is preferably greater than or equal to 50 mass %, is more preferably greater than or equal to 70 mass %, is even more preferably greater than or equal to 90 mass %, and is particularly preferably greater than or equal to 95 mass %.

Such a polypropylene-based resin composition according to this embodiment has excellent fluidity at the time of performing injection molding and excellent foaming properties. Then, according to such a polypropylene-based resin composition according to this embodiment, it is possible to mold a polypropylene-based foamed molded body having an excellent appearance, low thermal capacity per unit area, and large thermal resistance.

In the polypropylene-based resin composition according to this embodiment, a melt flow rate (MFR) (230° C., a load of 2.16 kg) which is measured on the basis of ASTM D-1238 in a state of not containing a foaming agent is generally greater than or equal to 30 g/10 minutes and less than or equal to 120 g/10 minutes, is preferably greater than or equal to 35 g/10 minutes and less than or equal to 110 g/10 minutes, and is more preferably greater than or equal to 40 g/10 minutes and less than or equal to 100 g/10 minutes, from the viewpoint of being preferable to the injection foam molding. It is preferable that MFR described above is in the range described above since the polypropylene-based resin composition has excellent molding properties and can also be preferably used in the injection foam molding using a thin cavity.

The polypropylene-based resin composition according to this embodiment can be preferably used in an application of performing the foam molding by adding a foaming agent, and can be particularly preferably used in an application of performing the injection foam molding. The type and an added amount of the foaming agent are selected according to the composition of the resin composition and the required physical properties of the foamed molded body, in consideration of the amount of generated gas from the foaming agent, a desired foaming ratio, and the like.

Hereinafter, each component configuring the polypropylene-based resin composition according to this embodiment will be described.

(Propylene•Ethylene-Based Block Copolymer (A))

The propylene•ethylene-based block copolymer (A) is a block copolymer containing propylene and ethylene as a configuration unit, and for example, includes a propylene homopolymer portion and an ethylene•propylene random copolymer portion. In addition, the propylene•ethylene-based block copolymer (A) generally has crystallinity.

In the propylene homopolymer portion of the propylene•ethylene-based block copolymer (A), an isotactic pentad fraction (mmmm) which is measured by $^{13}$C-NMR is preferably greater than or equal to 97%, and is more preferably greater than or equal to 97.5%. Here, the isotactic pentad fraction (an mmmm fraction) indicates a ratio of an isotactic chain in a pentad unit of a crystalline polypropylene molecular chain which is measured by using $^{13}$C-NMR. Specifically, an absorption peak of a $^{13}$C-NMR spectrum of a propylene monomer unit in the center of a chain in which five propylene monomer units are continuously subjected to meso bonding is obtained as a ratio of a methyl carbon region to the total absorption peak.

A propylene•ethylene-based block copolymer, in which the content of the ethylene•propylene random copolymer portion is preferably greater than or equal to 5 mass % and less than or equal to 30 mass %, is more preferably greater than or equal to 5 mass % and less than or equal to 25 mass %, and is even more preferably greater than or equal to 8 mass % and less than or equal to 18 mass %, and the content of the propylene homopolymer portion is preferably greater than or equal to 70 mass % and less than or equal to 95 mass %, is more preferably greater than or equal to 75 mass % and less than or equal to 95 mass %, and is even more preferably greater than or equal to 82 mass % and less than or equal to 92 mass %, is preferably used as the propylene•ethylene-based block copolymer (A) described above. Here, the total amount of the ethylene•propylene random copolymer portion and the propylene homopolymer portion is 100 mass %.

The content of the ethylene•propylene random copolymer portion of the propylene•ethylene-based block copolymer (A) described above can be measured from an existence amount of a soluble portion by separating the propylene•ethylene-based block copolymer (A) at a room temperature by using a p-xylene solvent.

Here, the propylene•ethylene-based block copolymer (A) contains a component which is insoluble in the p-xylene solvent and a component which is soluble in the p-xylene solvent. Here, the component which is insoluble in the p-xylene solvent is the propylene homopolymer portion, and the component which is soluble in the p-xylene solvent is the ethylene•propylene random copolymer portion.

Examples of a measurement method of the content of the ethylene•propylene random copolymer portion of the propylene•ethylene-based block copolymer (A) described above include the following method. First, 5 g of the propylene•ethylene-based block copolymer (A) is completely dissolved in boiling p-xylene, and after that, is left to stand during a whole day and night by lowering a temperature to 20° C., and then, an insoluble portion is separated by filtration. Next, 1500 ml of methanol is added to a filtrate, and is stirred. Next, a soluble portion is separated as a precipitate, and is filtered and dried, and thus, a p-xylene soluble portion is obtained. The soluble portion is weighed, and thus, the content of the ethylene•propylene random copolymer portion can be obtained.

In addition, as described in the examples described below, the content of the ethylene•propylene random copolymer portion of the propylene•ethylene-based block copolymer (A) described above can be measured from the existence amount of the soluble portion even in a method where n-decane is used with respect to the propylene•ethylene-based block copolymer (A).

Here, the propylene•ethylene-based block copolymer (A) contains a component which is insoluble in the n-decane and a component which is soluble in the n-decane. Here, the component which is insoluble in the n-decane is the propylene homopolymer portion, and the component which is soluble in the n-decane is the ethylene•propylene random copolymer portion.

The content of an ethylene unit in the propylene•ethylene-based block copolymer (A) described above is preferably in a range of greater than or equal to 1 mass % and less than or equal to 10 mass %, and is more preferably in a range of greater than or equal to 3 mass % and less than or equal to 8 mass %. The content of the ethylene unit in the propylene•ethylene-based block copolymer (A) can be obtained by performing infrared ray absorption spectrum analysis with respect to a press film of the propylene•ethylene-based block copolymer (A). That is, a light absorbance at 1155 cm$^{-1}$ based on a methyl group and a light absorbance based on a methylene group are measured, and the content can be measured by using a Gardner calibration curve (I. J. Gardner et al, Rubber Chem. and Tech., 44, 1015, 1971).

A propylene•ethylene-based block copolymer, in which a melt flow rate (MFR) (230° C., a load of 2160 g) which is measured on the basis ore ASTM D-1238 is preferably greater than or equal to 20 g/10 minutes and less than or equal to 150 g/10 minutes, is more preferably greater than or equal to 50 g/10 minutes and less than or equal to 140 g/10 minutes, and is even more preferably greater than or equal to 70 g/10 minutes and less than or equal to 120 g/10 minutes, can be preferably used as the propylene•ethylene-based block copolymer (A) described above. In a case where MFR is greater than or equal to the lower limit value described above, it is possible to prevent a flow mark or a weld mark from being generated on a surface of a polypropylene-based foamed molded body to be obtained or a heating shrinkage rate of the polypropylene-based foamed molded body to be obtained from increasing.

Here, only one type of the propylene•ethylene-based block copolymer (A) can be independently used, or two or more types thereof can be used in combination. In addition, in order to adjust the fluidity of the material, it is also possible to use a propylene•ethylene-based block copolymer with high fluidity or a propylene homopolymer with high fluidity in combination.

In general, a polymer is not configured by aggregating same molecules having the same molecular weight, but configured by aggregating molecules having different molecular weights to have certain physical properties as a whole. The propylene•ethylene-based block copolymer (A) used in this embodiment is also configured by aggregating molecules having different molecular weights, and has the content and MFR of the specific propylene homopolymer portion and the specific ethylene•propylene random copolymer portion described above as a whole polymer. In this embodiment, it is more preferable that a propylene•ethylene-based block copolymer, in which a propylene homopolymer portion and an ethylene•propylene random copolymer portion have a molecular weight or a composition described below, is used as the propylene•ethylene-based block copolymer (A).

That is, it is preferable that a propylene•ethylene-based block copolymer, in which MFR (230° C., a load of 2.16 kg) of a propylene homopolymer portion is preferably greater than or equal to 2 g/10 minutes and less than or equal to 1000 g/10 minutes, is more preferably greater than or equal to 50 g/10 minutes and less than or equal to 500 g/10 minutes, and is even more preferably greater than or equal to 150 g/10 minutes and less than or equal to 350 g/10 minutes, is used as the propylene•ethylene-based block copolymer (A).

In addition, in the ethylene•propylene random copolymer portion, an inherent viscosity [η] which is measured at 135° C. in decahydronaphthalene is greater than or equal to 4 dl/g and less than or equal to 10 dl/g, is preferably greater than or equal to 5 dl/g and less than or equal to 9 dl/g, and is particularly preferably greater than 5 dl/g and less than or equal to 9 dl/g. In addition, a content rate of a structural unit derived from ethylene in the ethylene•propylene random copolymer portion is generally greater than or equal to 20 mol % and less than or equal to 60 mol %, and is preferably greater than or equal to 30 mol % and less than or equal to 50 mol %.

A structural unit derived from known olefin such as 1-butene and 1-hexene, diene such as 1,7-octadiene, and a vinyl compound such as styrene may be included in the ethylene•propylene random copolymer portion according to this embodiment, within a range not impairing the object of this embodiment.

Among them, 1-butene is preferable. A content rate of the structural unit derived from the compound such as olefin described above which is used as necessary is preferably greater than or equal to 0 mol % and less than or equal to 5 mol %, and is more preferably greater than or equal to 0 mol % and less than or equal to 2 mol %. In addition, the structural unit derived from the compound described above is also included in the propylene homopolymer portion described above in addition to ethylene. The content rate of the structural unit is preferably greater than or equal to 0 mol % and less than or equal to 2 mol %, and is more preferably greater than or equal to 0 mol % and less than or equal to 1 mol %.

When a total of the propylene•ethylene-based block copolymer (A), the ethylene•α-olefin copolymer rubber (B) and the inorganic filler (C) is set to 100 parts by mass, the formulation amount of the propylene•ethylene-based block copolymer (A) in the polypropylene-based resin composition is preferably greater than or equal to 65 parts by mass and less than or equal to 90 parts by mass, and is more preferably greater than or equal to 72 parts by mass and less than or equal to 85 parts by mass.

The propylene•ethylene-based block copolymer (A) can be manufactured by various methods. For example, the propylene•ethylene-based block copolymer (A) can be manufactured by using a known olefin stereoregular catalyst such as a Ziegler-Matta catalyst or metallocene-based catalyst. Manufacturing examples of the propylene•ethylene-based block copolymer (A) can include a method in which propylene is polymerized in the presence of a catalyst formed of a solid catalyst component, an organic metal compound catalyst component, and as necessary, an electron donor, and subsequently, propylene and ethylene are copolymerized.

More specifically, the propylene•ethylene-based block copolymer (A) can be manufactured by using a known titanium catalyst. Preferred examples of the titanium catalyst include a solid catalyst for polymerization in which a solid titanium catalyst component containing each atom of titanium, magnesium, ad halogen and an aluminum compound are contained as a main component.

Examples of a method of manufacturing the propylene•ethylene-based block copolymer (A) include a method in which the propylene•ethylene-based block copolymer (A) is manufactured by multi-stage polymerization in the presence of a catalyst for manufacturing high stereoregular polypropylene, on the basis of a method described in Japanese Laid-open Patent Publication No. H11-107975 or Japanese Laid-open Patent Publication No. 2004-262993. That is, the propylene•ethylene-based block copolymer (A) can be manufactured by multi-stage polymerization of two or more stages including a stage where 70 to 95 mass % of the propylene homopolymer portion obtained by polymerizing propylene substantially in the presence of hydrogen or in the absence of hydrogen in a first stage is manufactured with respect to the total of the propylene•ethylene-based block copolymer (A) which is finally obtained and a stage where 5 to 30 mass % of the ethylene•propylene random copolymer portion obtained by polymerizing ethylene and propylene is manufactured with respect to the total of the propylene•ethylene-based block copolymer (A) which is finally obtained, in the presence of a polymerization catalyst for manufacturing high stereoregular polypropylene to be formed of (i) a solid titanium catalyst component containing magnesium, titanium, halogen, and an electron donor, (ii) an organic metal compound catalyst component, and (iii) a donor component.

MFR and the inherent viscosity [η] of the propylene•ethylene-based block copolymer (A) can be suitably adjusted by adjusting polymerization conditions and the like, and a method of using hydrogen as a molecular weight adjuster is preferable, but is not particularly limited.

The multi-stage polymerization can be continuously performed, and can be performed in a batch manner or a semi-continuous manner, but it is preferable that the multi-stage polymerization is continuously performed. In addition, the polymerization can be performed by a known method such as a vapor phase polymerization method or a liquid phase polymerization method such as solution polymerization, slurry polymerization, and bulk polymerization. It is preferable that the polymerization after the second stage is continuously performed subsequent to the polymerization of the prior stage, and in a case where the polymerization is performed in a batch manner, the multi-stage polymerization can be performed by using one polymerization vessel.

Inert carbon-hydrogens may be used as a polymerization medium, and liquid propylene may be used as the polymerization medium. In addition, multi-stage polymerization conditions are suitably selected from a polymerization temperature range of approximately −50° C. to +200° C., and preferably a polymerization temperature range of approximately 20° C. to 100° C., and from a polymerization pressure range of an ordinary pressure to 9.8 MPa (a gauge pressure), and preferably a polymerization pressure range of approximately 0.2 to 4.9 MPa (a gauge pressure).

(Ethylene•α-Olefin Copolymer Rubber (B))

An ethylene•α-olefin copolymer rubber having excellent compatibility with respect to the propylene•ethylene-based block copolymer (A) can be used as the ethylene•α-olefin copolymer rubber (B) without any limitation, and in this embodiment, it is preferable that a copolymer of ethylene and α-olefin having 3 to 10 carbon atoms is used as the ethylene•α-olefin copolymer rubber (B).

Examples of the α-olefin described above include propylene, 1-butene, 1-pentene, 1-hexene, 4-methyl-1-pentene, 3-methyl-1-pentene, 1-heptene, 1-octene, 1-nonene, 1-decene, and the like. Only one type of the olefin may be independently used, or two or more types thereof may be used by being mixed. Among them, 1-butene and 1-octene are particularly preferable.

MFR of the ethylene•α-olefin copolymer rubber (B) which is measured at a temperature of 190° C. and a load of 2.16 kg on the basis of ASTM D-1238 is preferably greater than or equal to 1 g/10 minutes and less than or equal to 50 g/10 minutes, and is more preferably greater than or equal to 10 g/10 minutes and less than or equal to 40 g/10 minutes. In addition, the density of the ethylene•α-olefin copolymer rubber (B) is preferably greater than or equal to 0.84 g/cm$^3$ and less than or equal to 0.94 g/cm$^3$, and is more preferably greater than or equal to 0.86 g/cm$^3$ and less than or equal to 0.92 g/cm$^3$.

Only one type of the ethylene•α-olefin copolymer rubber (B) may be independently used, or two or more types thereof may be used in combination, and it is preferable that MFR and the density described above are satisfied as the whole ethylene•α-olefin copolymer rubber (B).

When the total of the propylene•ethylene-based block copolymer (A), the ethylene•α-olefin copolymer rubber (B), and the inorganic filler (C) is set to 100 parts by mass, the formulation amount of the ethylene•α-olefin copolymer rubber (B) in the polypropylene-based resin composition is preferably greater than or equal to 10 parts by mass and less than or equal to 30 parts by mass, and is more preferably greater than or equal to 15 parts by mass and less than or equal to 28 parts by mass.

The ethylene•α-olefin copolymer rubber (B) can be manufactured by a known method of the related art, and various commercially available products can also be used. Tafmer A series and•H series manufactured by Mitsui Chemicals, Inc., Engage series manufactured by The Dow Chemical Company, Exact series manufactured by Exxon Mobil Corporation, and the like can be preferably used as the commercially available product.

(Inorganic Filler (C))

The inorganic filler (C) is not particularly limited, and examples of the inorganic filler (C) include heavy calcium carbonate, light calcium carbonate, talc, glass fiber, magnesium carbonate, mica, kaoline, calcium sulfate, barium sulfate, titanium white, white carbon, carbon black, aluminum hydroxide, magnesium hydroxide, clay, magnesium oxide, silicates, carbonates, plaster, wollastonite, alumina, silica, calcium sulfite, carbon fiber, metal fiber, silica sand, zeolite, molybdenum, diatomaceous earth, sericite, white sand, calcium hydroxide sodium sulfate, bentonite, graphite, and the like. Only one type of the inorganic filler (C) may be independently used, or two or more types thereof may be used by being mixed. Among them, talc is most preferable.

An average particle diameter $D_{50}$ of the inorganic filler (C) is not particularly limited, but is preferably greater than or equal to 0.5 μm and less than or equal to 20 μm, and is more preferably greater than or equal to 1.0 μm and less than or equal to 15 μm.

Furthermore, the average particle diameter $D_{50}$ is a particle diameter at the time of performing 50% cumulation in a volume-based cumulative distribution, and is an average particle diameter at the time of being measured by using a commercially available laser type particle size analyzer.

When the total of the propylene•ethylene-based block copolymer (A), the ethylene•α-olefin copolymer rubber (B), and the inorganic filler (C) is set to 100 parts by mass, the formulation amount of the inorganic filler (C) in the polypropylene-based resin composition is preferably greater than or equal to 0 parts by mass and less than or equal to 5 parts by mass, and is more preferably greater than or equal to 0 parts by mass and less than or equal to 3 parts by mass.

(Foaming Agent (D))

The foaming agent (D) is not particularly limited, and examples of the foaming agent (D) include a chemical foaming agent, a physical foaming agent, a solvent type foaming agent, a decomposable foaming agent, and the like. Examples of the physical foaming agent include a gaseous physical foaming agent, a physical foaming agent in a supercritical state, and the like.

The solvent type foaming agent described above is a substance which functions as a foaming agent by being injected from a cylinder portion of an injection molding machine, being absorbed or dissolved in a propylene-based resin composition in a melting state, and then, being evaporated in an injection molding metal mold. Examples of the solvent type foaming agent include low boiling aliphatic hydrocarbon such as propane, butane, neopentane, heptane, isohexane, hexane, isoheptane, and heptane, low boiling fluorine-containing hydrocarbon represented by chlorofluorocarbon gas, and the like.

The decomposable foaming agent described above is a substance which functions as a foaming agent by being formulated in advance in a raw material resin composition in the form of a powder, a master batch, and the like, and then, being supplied to the injection molding machine, being decomposed under cylinder temperature conditions of the injection molding machine, and generating gas such as carbon dioxide gas and nitrogen gas. The decomposable foaming agent may be an inorganic foaming agent or an organic foaming agent. In addition, in the decomposable foaming agent described above, an organic acid such as a citric acid accelerating gas generation or an organic acid metal salt such as sodium citrate, or the like may be used together as a foaming auxiliary.

Specific examples of the decomposable foaming agent described above can include compounds described below.

(1) Inorganic Foaming Agent: sodium bicarbonate, sodium carbonate, ammonium bicarbonate, ammonium carbonate, and ammonium nitrite (2) Organic Foaming Agent: (a) N-nitroso compound: N,N'-dinitrosoterephthalamide and N,N'-dinitrosopentamethylene tetramine; (b) azo compound: azodicarbonamide, azobisisobutyronitrile, azocyclohexyl nitrile, azodiaminobenzene, and barium azodicarboxylate; (c) sulfonyl hydrazide compound: benzene sulfonyl hydrazide, toluene sulfonyl hydrazide, p,p'-oxy bis(benzene sulfenyl hydrazide), and diphenyl sulfone-3,3'-disulfonyl hydrazide; (d) azide compound: calcium azide, 4,4'-diphenyl disulfonyl azide, and p-toluene sulfonyl azide The gaseous physical foaming agent or the physical foaming agent in the supercritical state is not particularly limited insofar as the physical foaming agent is a general physical foaming agent, and examples thereof include inert gas such as carbon dioxide, nitrogen, argon, helium, neon, and astatine. Among them, carbon dioxide, nitrogen, and argon are excellent, in which there is no necessity to set the physical foaming agent to be vapor, the price is low, and a risk of environmental contamination and fire extremely decreases.

Only one type of the foaming agent (D) may be independently used, or two or more types thereof may be used by being mixed. Then, the foaming agent (D) can be formulated in advance in the raw material resin composition in the form of a powder, a master batch, or the like before performing molding, and can be injected from the middle of the cylinder at the time of performing the injection foam molding.

Among such foaming agents (D), a thermally decomposable foaming agent containing at least one type selected from carbonate such as sodium hydrogen bicarbonate and hydrogen carbonate is preferable, and at this time, it is desirable that an organic carboxylic acid is used together as a foaming auxiliary. In a formulation ratio of the carbonate or the hydrogen carbonate to the organic carboxylic acid, it is preferable that the carbonate or the hydrogen carbonate is in a range of greater than or equal to 30 parts by mass and less than or equal to 65 parts by mass, and the organic carboxylic acid is in a range of greater than or equal to 35 parts by mass and less than or equal to 70 parts by mass. Here, the total amount of both of the carbonate or the hydrogen carbonate and the organic carboxylic acid is 100 parts by mass.

Furthermore, in the use of the foaming agent (D) and the foaming auxiliary, it is preferable that a master batch containing the foaming agent (D) and the foaming auxiliary is prepared in advance, is blended with the polypropylene-based resin composition, and is supplied to a molding machine, from the viewpoint of productivity.

The formulation amount of the foaming agent (D) is selected according to the required properties of a polypropylene-based foamed molded body to be manufactured, in consideration of the amount of generated gas from the foaming agent (D), a desired foaming ratio, and the like, and is generally greater than or equal to 0.8 parts by mass and less than or equal to 4.0 parts by mass, and is preferably greater than or equal to 0.9 parts by mass and less than or equal to 3.5 parts by mass, with respect to 100 parts by mass of the total of the propylene•ethylene-based block copolymer (A), the ethylene•α-olefin copolymer rubber (B), and the inorganic filler (C). In a case where an added amount of the foaming agent (D) is in such a range, it is possible to obtain a polypropylene-based foamed molded body in which the diameters of the air bubble cells are uniform, and the air bubble cells are evenly dispersed. Furthermore, the formulation amount of the foaming agent it not the amount of foaming agent master batch, but the amount of actual component of the foaming agent which generates gas.

(Other Additives)

The polypropylene-based resin composition according to this embodiment, as necessary, may contain various additives within a range not impairing the object thereof. Examples of the additive described above can include a nucleator, an antioxidant, a hydrochloric acid absorbent, a heat-resistant stabilizer, a weather-resistant stabilizer, a light stabilizer, an ultraviolet ray absorbent, a lubricant, an antistatic agent, a flame retardant, a pigment, a dye, a dispersant, a copper inhibitor, a neutralizer, a plasticizer, a cross-linking agent, a peroxide, a weld strength improver, natural oil, synthetic oil, wax, and the like.

(Preparation Method of Polypropylene-Based Resin Composition)

The polypropylene-based resin composition according to this embodiment, for example, can be prepared by mixing or melting and kneading each component with a mixer such as a Banbury mixer, a single screw extruder, a twin screw extruder, and a high rate twin screw extruder. A mixing sequence of each of the components is arbitrary, and each of the components may be simultaneously mixed, or a multi-stage mixing method can be adopted in which a part of the components is mixed, and then, the other components are mixed.

[Manufacturing Method of Polypropylene-Based Foamed Molded Body]

The polypropylene-based foamed molded body according to this embodiment can be obtained by performing foam molding with respect to the polypropylene-based resin composition described above.

It is preferable that the polypropylene-based foamed molded body according to this embodiment, for example, is obtained by performing injection foam molding with respect to the polypropylene-based resin composition described above by using an injection molding machine.

Furthermore, the foaming agent (D) may be added to the polypropylene-based resin composition before being supplied to the injection molding machine, or the foaming agent (D) may be supplied to the injection molding machine in which the polypropylene-based resin composition is melted and kneaded.

The injection foam molding is performed by performing injection filling with respect to the cavity of the metal mold with the polypropylene-based resin composition from the injection molding machine, and then, increasing the volume of the cavity, foaming the polypropylene-based resin composition, and by manufacturing a foamed molded body.

The molding metal mold used in the injection foam molding is configured of a fixed mold and a movable mold, and it is preferable that the fixed mold and the movable mold are in a mold clamping state at the time of performing the injection filling of the polypropylene-based resin composition. In addition, in the volume of the cavity, it is general that the cavity is enlarged and opened by retracting (core-backing) the movable mold, and the volume of the cavity can also be increased by moving a part of the metal mold. In particular, it is preferable that the volume of the cavity is increased by moving the movable mold for a suitable time after performing the injection filling.

An initial position of the movable mold is a position at the time of being in a mold clamping state to which a mold clamping force is applied, in which the fixed mold and the movable mold are closest to each other. In a place where the volume of the cavity is approximately identical to the volume of a melt of the polypropylene-based resin composition used in single molding which is subjected to filling in an unfoamed state, a cavity close to the shape of a product is formed.

In this embodiment, a length in an enlarging and opening direction at the time of starting the injection, which is formed between the fixed mold and the movable mold, that is, a cavity clearance ($T_0$) of the metal mold at the time of starting the injection is generally set to be in a range of greater than or equal to 0.7 mm and less than 1.5 mm, is preferably set to be in a range of greater than or equal to 0.7 mm and less than or equal to 1.4 mm, and is more preferably set to be in a range of greater than or equal to 0.9 mm and less than or equal to 1.4 mm.

In a case where the cavity clearance ($T_0$) is greater than or equal to the lower limit value described above, it is possible to sufficiently ensure the cavity to be subjected to the injection filling, and to prevent the polypropylene-based resin composition from being incapable of being sufficiently supplied to or filled in the cavity due to an increase in the viscosity, solidification, or the like of the polypropylene-based resin composition. For this reason, it is possible to reduce forced injection filling at a high pressure in order to sufficiently fill the cavity with the polypropylene-based resin composition, and to prevent a burr from being generated due to high pressurization of an injection filling pressure, a foaming failure from occurring due to a fact that the resin composition is rapidly cooled by the metal mold, and thus, is not sufficiently foamed even in a case of being core-backed, and the like.

An injection time of the polypropylene-based resin composition to the cavity of the metal mold is not particularly limited, but it is desirable that the injection time is preferably 0.5 to 5.0 seconds, and is more preferably approximately 0.7 to 4.0 seconds, and it is desirable that a retardation time of preferably 0 to 5 seconds, and of more preferably 0 to 3 seconds, is provided after completing the injection, and after that, a partition wall configuring the cavity is moved preferably at 1 to 50 mm/second, and more preferably at 1 to 40 mm/second, and thus, the volume of the cavity is enlarged. By providing the retardation time, it is possible to control the thickness of the solid skin layer, and in a case of lengthening the retardation time, it is possible to make the solid skin layer thick, and as a result thereof, it is possible to increase mechanical and physical properties such as the rigidity. Here, it is desirable that an enlargement ratio of the volume of the cavity is generally 1.8 to 6.0 times, and is preferably 1.9 to 5.0 times.

In addition, a ratio ($T_1/T_0$) of a length ($T_1$) of a sectional surface of the cavity in the enlarging and opening direction after retracting the movable mold to $T_0$ is preferably greater than or equal to 1.8 and less than or equal to 6.0, and is more preferably greater than or equal to 1.9 and less than or equal to 6.0. In a case where $T_1/T_0$ is greater than or equal to the lower limit value described above, it is possible to efficiently obtain desired rigidity and desired thermal resistance.

A core movement speed at the time of performing core-backing is different according to the thickness of the molded body, the type of resin, the type of foaming agent, a metal mold temperature, and a resin temperature, and for example, is preferably approximately 1.0 to 50 mm/second. In a case where the core movement speed is greater than or equal to the lower limit value described above, the resin is solidified in the middle of the core-backing, and thus, it is possible to prevent a sufficient foaming ratio from being incapable of being obtained. In a case where the core movement speed is less than or equal to the upper limit value described above, it is possible to prevent a molded body having an excellent appearance not from being obtained due to a fact that the generation and the growth of the cell do not follow the movement of the core, and thus, the cell is broken.

The temperature of the propylene-based resin composition to be subjected to the injection and the metal mold temperature are different according to the thickness of the molded body, the type of resin, the type of foaming agent, an added amount of the foaming agent, and the like, a temperature which is generally used in the molding of the polypropylene-based resin composition is sufficient, and in a case of thinning the thickness of a product and of increasing the foaming ratio, the temperature may be set to be higher than a general metal mold temperature.

Specifically, the temperature of the polypropylene-based resin composition to be subjected to the injection is preferably higher than or equal to 170° C. and lower than or equal to 250° C., and is more preferably higher than or equal to 180° C. and lower than or equal to 230° C.

In addition, metal mold temperatures of the fixed mold and the movable mold at the time of performing the injection are preferably higher than or equal to 25° C. and lower than or equal to 80° C., and are more preferably higher than or equal to 30° C. and lower than or equal to 70° C.

In addition, an injection rate of the injection molding machine in the filling of metal mold with the polypropylene-based resin composition is preferably greater than or equal to 100 cm$^3$/second and less than or equal to 2,000 cm$^3$/second, and is more preferably greater than or equal to 200 cm$^3$/second and less than or equal to 1,500 cm$^3$/second. In addition, at this time, an injection pressure of the injection molding machine is preferably greater than or equal to 70 MPa and less than or equal to 200 MPa, and is more preferably greater than or equal to 80 MPa and less than or equal to 160 MPa.

As with this embodiment, the cavity is filled with the polypropylene-based resin composition at one time, and then, the polypropylene-based resin composition is foamed, and a resin of a portion in contact with the metal mold is solidified faster compared to a resin in the inside, and thus, it is possible to form an unfoamed skin layer (the solid skin layer) on the surface of the polypropylene-based foamed molded body. Accordingly, it is possible to obtain a polypropylene-based foamed molded body with high thermal resistance in which a rigid product shape is obtained in appearance, the inside has high rigidity in a foamed state, lightweight is realized, the thermal capacity per unit area is small, and thermal transmission from the surface of the molded body to a back surface is suppressed.

In addition, even in a case where some distributions are generated in a cell shape, a cell density, and a foaming ratio in the polypropylene-based foamed molded body, it is possible to obtain a molded body in which the appearance is excellent due to the smoothness and the rigidity of the solid skin layer. The thickness of the solid skin layer is not particularly limited, but it is desirable that the thickness is preferably greater than or equal to 0.1 mm and less than or equal to 0.5 mm, and is more preferably greater than or equal to 0.2 mm and less than or equal to 0.45 mm.

A timing at which the metal mold actually starts to be opened by the core-backing for forming the solid skin layer having the thickness described above is different according to the type of resin, the type of foaming agent, the metal mold temperature, and the resin temperature, and in a case of using a general polypropylene-based resin composition, the timing is preferably longer than 0 seconds and shorter than or equal to 5 seconds, and is more preferably longer than 0 seconds and shorter than or equal to 3 seconds, from the completion of the injection filling.

In a case where a time from the completion of the injection filling to the core-backing is longer than or equal to the lower limit value described above, it is possible to form a skin layer having a sufficient thickness, and in a case where the time is shorter than or equal to the upper limit value described above, it is possible to suppress the progress of the solidification of the polypropylene-based resin composition, and thus, it is possible to obtain a sufficient foaming ratio.

The foaming ratio can be suitably controlled according to the resin temperature, an injection speed, a waiting time from the end of the injection filling to the start of the core-backing, a core-backing amount, a core-backing speed, a cooling time after the end of the core-backing, and the like, and is preferably greater than or equal to 1.8 times and less than or equal to 6.0 times. In addition, the core-backing can also be performed by being divided into several stages, and thus, it is possible to obtain a polypropylene-based foamed molded body in which a cell structure or an end portion shape is controlled.

In addition, in this embodiment, it is possible to use a hot runner or a shut-off nozzle, a valve gate, and the like, which are used in general injection molding. The valve gate or the hot runner has an effect of not only suppressing the generation of a waste resin such as a runner, but also preventing the failure of a foamed molded body in the next cycle from occurring due to a fact that the propylene-based resin composition is leaked from the metal mold to the cavity.

In addition, in this embodiment, it is preferable that a material having thermal conductivity lower than that of rolled steel SS400 or carbon steel S45C for a general structure is disposed on one surface or both surfaces of the cavity of the metal mold, and it is preferable that a heat insulating layer of which the thermal conductivity is greater than or equal to 0.18 W/m·K and less than or equal to 40 W/m·K, is preferably greater than or equal to 0.18 W/m·K and less than or equal to 36 W/m·K, and is more preferably greater than or equal to 0.18 W/m·K and less than or equal to 33 W/m·K is disposed. It is desirable that various resins having heat resistance, ceramic such as zirconia, alumina, and silicon nitride, and the like are used in the heat insulating layer. However, in a case where the thermal conductivity is in the range described above, using a metal containing different elements, or the like is one of desired aspects. The plate thickness itself of the heat insulating layer is not strict, and in a case where the heat insulating layer is in the shape of a thin film having a thickness of approximately greater than or equal to 0.01 mm and less than or equal to 0.5 mm, it is possible to instantaneously delay the cooling of the filled propylene-based resin composition, and to further improve the appearance of the polypropylene-based foamed molded body. In addition, even in a case where a heat insulating layer having thermal conductivity of greater than or equal to the range described above is used on the surface of the cavity, laminating a member and using a member in which average thermal conductivity from a cavity surface layer to a depth of 5 mm decreases is also one of desired methods.

After the foaming ends, the cooling is performed as it is, and thus, it is possible to take out the polypropylene-based foamed molded body, and to obtain a polypropylene-based foamed molded body having an excellent recess shape or an excellent cell shape while controlling a contact state between the polypropylene-based foamed molded body and the metal mold by slightly clamping the mold and shortening a molding cycle by accelerating the cooling.

In a manufacturing method of a polypropylene-based foamed molded body of this embodiment, for example, it is possible to preferably obtain a polypropylene-based foamed molded body having a thickness of approximately 1.2 to 8 mm. In a case where the polypropylene-based foamed molded body has independent air bubbles, the average cell diameter thereof is approximately 0.1 to 1.0 mm, and even in a case where the cell diameter is several mm, some cells of which parts are communicated with each other may exist according to the shape of the molded body or the application. In particular, in a case where the foaming ratio is high, a plurality of cells are assembled together and are communicated with each other, and the inside of the polypropylene-based foamed molded body is in a hollow state, but a support rod of a resin is formed in the hollow, and thus, the polypropylene-based foamed molded body is highly lightened and has strong rigidity.

As described above, the embodiments of the present invention have been described, but the embodiments are examples of the present invention, and various configurations other than the above description can be adopted.

EXAMPLES

Hereinafter, this embodiment will be described in detail with reference to examples and comparative examples. Furthermore, this embodiment is not limited to the description of the examples.

1. Injection Foam Molding Method

In the examples and the comparative examples described below, injection foam molding was performed in the following conditions.

[Injection Molding Machine] An injection molding machine of 850 t (MD850S-III Type manufactured by UBE MACHINERY CORPORATION, Ltd.) or an injection molding machine of 350 t (MD350S-III Type manufactured by UBE MACHINERY CORPORATION, Ltd.) was used.

[Metal Mold]

(for Injection Molding Machine of 850 t)

Cavity Size: a length of 800 mm, a width of 500 mm, and a variable thickness

Gate: a two-point direct gate was use in the current molding (a region of 400×500 mm per one gate was filled)

The injection molding machine was provided with a hot runner and a valve gate (for Injection Molding Machine of 350 t)

Cavity Size: a length of 400 mm, a width of 200 mm, and a variable thickness

Gate: a one-point direct gate

2. Measurement and Evaluation Method

In the examples and the comparative examples described below, each of the physical properties was measured and evaluated by the following method.

[Fluidity (Melt Flow Rate: MFR)]

Unless otherwise particularly stated, MFR was measured at a temperature of 230° C. and a load of 2.16 kg on the basis of an ASTM D-1238 method in a state of not containing a foaming agent, and in a case of a rubber component, MFR was measured in conditions of a temperature of 190° C. and a load of 2.16 kg on the basis of the ASTM D-1238 method.

[Contents of Component (a1) Insoluble in n-Decane and Component (a2) Soluble in n-Decane in Propylene•Ethylene-Based Block Copolymer]

Approximately 3 g of a propylene•ethylene-based block copolymer (measured up to the unit of $10^{-4}$ g, and the mass was described as b (g) in the following expression), 500 mL of n-decane, and a small amount of a heat-resistant stabilizer which was soluble in n-decane were put into a measurement container formed of glass, and were heated to 150° C. for 2 hours while being stirred by a stirrer under a nitrogen atmosphere, and thus, the propylene•ethylene-based block copolymer was dissolved in the n-decane. Next, the mixture was retained at 150° C. for 2 hours, and then, was gradually cooled to 23° C. for 8 hours.

A liquid containing a precipitate of the obtained propylene•ethylene-based block copolymer was filtered by a glass filter standardized by 25G-4, which was manufactured by Iwata Glass Industrial Co., Ltd. under reduced pressure. 100 mL of a filtrate was sampled, and the sampled filtrate was dried under reduced pressure, and thus, a part of the component (a2) described above was obtained. The mass thereof was measured up to the unit of $10^{-4}$ g (the mass was described as a (g) in the following expression). Next, the contents of the components (a1) and (a2) in the propylene•ethylene-based block copolymer were obtained by the following expressions.

Content of Component ($a2$) [mass %]=100×5$a/b$

Content of Component ($a1$) [mass %]=100−Content of Component ($a2$)

[Inherent Viscosity]

Approximately 20 mg of a sample was dissolved in 15 ml of decahydronaphthalene, and a specific viscosity ηsp was measured in an oil bath at 135° C. Dilution was performed by adding 5 ml of a decahydronaphthalene solvent to the decahydronaphthalene solution, and similarly, the specific viscosity $\eta_{sp}$ was measured. The dilution operation was further repeated two times, the value of $\eta_{sp}/C$ at the time of extrapolating a concentration (C) to 0 was obtained as the inherent viscosity [$\eta$].

$$[\eta]=lim(\eta_{sp}/C)(C\rightarrow 0)$$

[Density]

The density was measured on the basis of ISO 1183 (JIS K7112).

[Foaming Ratio]

When a plate thickness (a substantial thickness) of a molded body not having air bubbles was set to $t_0$, and a plate thickness of the polypropylene-based foamed molded body is set to $t_1$, a plate thickness ratio $t_1/t_0$ was set to the foaming ratio.

[Cell State of Foamed Layer]

A sectional surface of the obtained polypropylene-based foamed molded body was evaluated on the basis of the following criteria.

B: Independent air bubbles not having broken bubbles or continuous air bubbles having a length of less than the plate thickness existed on a foamed layer, and continuous air bubbles having a long length of greater than or equal to the plate thickness did not exist C: Continuous air bubbles having a long length of greater than or equal to the plate thickness existed on the foamed layer due to broken bubbles

[Substantial Thickness ($t_0$) of Polypropylene-Based Foamed Molded Body]

The substantial thickness ($t_0$) of the polypropylene-based foamed molded body is a thickness in a case of completely removing air bubbles existing in the foamed molded body having a the specific surface area, and in general, is a value identical to the cavity clearance ($T_0$) of the injection molding metal mold at the time of starting the injection in the injection molding. In this embodiment, a measurement method of the substantial thickness ($t_0$) is as described below.

First, a part of the polypropylene-based foamed molded body is cut out into the shape of a square plate (the area of one surface is generally 1 or 4 cm$^2$), and the area of one surface of the test piece is accurately measured and is set to S cm$^2$. Next, the test piece is subjected to a defoaming treatment at 200° C. under reduced pressure of less than or equal to 50 mmHg, and then, is subjected to a pressurized slow cooling treatment in nitrogen gas of approximately 1 atmosphere pressure, and thus, a foamless test piece which is defoamed is obtained. In a case where the mass thereof is set to W (g), and the density thereof is set to $D_0$ (g/cm$^3$), a value (mm) calculated by Expression 2 described below is set to the substantial thickness ($t_0$). A sampling portion of the test piece is arbitrarily changed in the same flat portion, and this operation is repeated 5 times in total, and thus, the substantial thickness is measured, and the average value thereof is set to the substantial thickness ($t_0$) of the polypropylene-based foamed molded body.

$$t_0 \text{ (mm)}=10\times W/(D_0\times S) \quad \text{(Expression 2)}$$

[Measurement of Thickness of Skin Layer]

The thickness of the skin layer was measured by the following method. First, the sectional surface of the foamed molded body was cut by an incisive blade such that the cell was not broken, and a picture of the sectional surface was imaged. From the picture of the sectional surface, the thickness of the solid skin layer (the first solid skin layer and the second solid skin layer) in a surface layer portion with respect to the total plate thickness was measured in the unit of mm, and the average thereof was set to the thickness of the skin layer.

[Appearance of Polypropylene-Based Foamed Molded Body]

The appearance of the polypropylene-based foamed molded body was evaluated by the amount of swirl mark and an avatar generated on the surface of the polypropylene-based foamed molded body.

A: The swirl mark or the avatar was not observed at all on the entire surface of the molded body B: The swirl mark or the avatar was not on the entire surface of the molded body, or a fade swirl mark or a minute avatar was observed, but an appearance failure was not capable of being confirmed by embossing C: A large amount of swirl marks and/or avatars were generated on the entire surface of the molded body, and the appearance failure was not capable of being shielded by the embossing

[Thermal Capacity Per Unit Area (Q)]

Specific thermal capacity of the foamed molded body was measured by using a differential scanning calorimetry device manufactured by PerkinElmer Co., Ltd., and thus, the thermal capacity per unit area (Unit: kJ/m$^2$·K) at 30° C. of the foamed molded body subjected to the injection foam molding from the polypropylene-based resin composition was obtained. Furthermore, in this embodiment, there is a case where the thermal capacity per unit area (Unit: kJ/m$^2$·K) is described as a heat storage amount per unit area (Unit: kJ/m$^2$·K).

[Thermal Resistance (R)]

A thermal resistance value (Unit: m$^2$·K/W) in a plate thickness direction was measured by using a steady method thermal conductivity measurement device manufactured by ADVANCE RIKO, Inc., according to a steady method heat flowmeter method and an ASTM E1530 method (30° C.).

[Bending Rigidity]

In the injection foamed molded bodies obtained in the examples and the comparative examples, it is confirmed that the first solid skin layer, the foamed layer, and the second solid skin layer are in a state of being laminated in this order. This structure exhibits lightweight and high rigidity due to an effect of sectional secondary moment. In addition, it is considered that the rigidity theory of a sandwich panel can be generally applied to a structure where such a foamed layer is interposed between two unfoamed skin layer plates (the solid skin layers) having a high strength. For this reason, in a three-layer structure obtained by the injection foam molding, an elastic modulus of a solid portion can be comparatively easily analogized. However, in an elastic modulus of the foamed layer in the center, a result is obtained in which the physical properties are considerably different according to unevenness in a depth direction and a cell state in the foamed layer, associated with a change in the molding conditions or the foaming ratio.

Therefore, in this embodiment, the foamed molded body was assumed as an even material, and a bending test was performed, and thus, a bending elastic modulus (E) of the molded body was measured, and sectional secondary moment (I) was calculated by using the plate thickness which was a shape factor. Therefore, bending rigidity (E·I) was calculated.

In an evaluation method, a bending elastic modulus of a sample which was obtained by cutting out the polypropylene-based foamed molded body to have a size of a width of 50 mm and a length of 150 mm was obtained by performing a three-point bending test by using a bending test device in which the diameters of a supporting portion and a loading portion were 3.2 mmR in conditions (an ASTM D790 method, 23° C.) of a distance between the supporting points of 100 mm and a load speed of 50 mm/minute, and the bending rigidity of the polypropylene-based foamed molded body was calculated by using a plate thickness of a test piece measured in advance. At this time, in the calculation of the bending rigidity, evaluation was conducted by calculating as a width per unit width (1 m).

[Surface Impact Energy]

Surface impact energy (23° C.) in a high rate surface impact test (HRIT) was measured as follows on the basis of ISO 6603-2. A high rate impact tester (RIT-8000 Type) manufactured by Rheometric Scientific, Inc. (US) was used as a measurement device. First, a flat plate test piece (a plate thickness was different according to a molded body) of 120×130 (mm) cut out from a plate which was subjected to the injection foam molding was fixed by a circular retainer of 3 inches. Next, an impact probe having a diameter of ½ inches (the radius of a tip spherical surface of ¼ inches) was brought into contact with the test piece at a speed of 5 m/second, and thus, a deformation amount and the stress of the test piece were detected, and an area integral value was calculated, and thus, the surface impact energy was obtained. In addition, total energy (TE) which was an energy value required until a material was broken was measured, and was set to surface impact energy (J). State adjustment was performed by a constant temperature oven provided in the device. Specifically, the test piece was put into the constant temperature oven of which the temperature was adjusted in advance to a predetermined temperature (23° C.), and the state adjustment was performed for 2 hours, and then, the test described above was performed.

3. Preparation of Raw Material

[Preparation Example] [Manufacturing of Propylene•Ethylene-Based Block Copolymer (A1)]

(1) Preparation of Solid Titanium Catalyst Component 95.2 g of anhydrous magnesium chloride, 442 ml of decane, and 390.6 g of 2-ethyl hexyl alcohol were subjected to a heating reaction at 130° C. for 2 hours, and thus, a homogeneous solution was obtained. Next, 21.3 g of phthalic anhydride was added into the solution, and was stirred and mixed at 130° C. for 1 hour, and thus, the phthalic anhydride was dissolved.

The homogeneous solution obtained as described above was cooled to a room temperature, and then, 75 ml of the homogeneous solution was dropped and charged into 200 ml of titanium tetrachloride retained at −20° C., for 1 hour. After the charging ended, the temperature of the mixed liquid was elevated to 110° C. for 4 hours, and in a case where the temperature reached 110° C., 5.22 g of diisobutyl phthalate (DIBP) was added to the mixed liquid, and then, was stirred and retained at the same temperature for 2 hours.

After the reaction for 2 hours ended, a solid portion was sampled by heat filtration, and the solid portion was resuspended in 275 ml of titanium tetrachloride, and then, was heated again at 110° C. for 2 hours. After the reaction ended, the solid portion was sampled again by the heat filtration, and was sufficiently washed with decane and hexane at 110° C. until a free titanium compound was not detected in the solution.

Here, the detection of the free titanium compound was confirmed by the following method. 10 ml of a supernatant solution of the solid catalyst component described above was sampled and charged into a side-arm Schlenk flask of 100 ml which was subjected to nitrogen substitution in advance by an injector. Next, solvent hexane was dried by nitrogen airflow, and was further subjected to vacuum drying for 30 minutes. 40 ml of ion exchange water and 10 ml of (1+1) sulfuric acid were charged thereinto, and were stirred for 30 minutes. The aqueous solution was moved to a measuring flask of 100 ml through filter paper, and then, 1 ml of a concentrated phosphoric acid as a masking agent of an iron (II) ion and 5 ml of hydrogen peroxide water of 3% as a coloring reagent of titanium were added, the measuring flask which was diluted to 100 ml with ion exchange water was shaken, and after 20 minutes, light absorbance at 420 nm was observed by using UV, and free titanium was washed and removed until the absorption was not observed. The solid titanium catalyst component prepared as described above retained as a decane slurry, and a part thereof was dried in order to examine the catalyst composition. In the composition of a solid titanium catalyst component (A) obtained as described above, titanium was 2.3 mass %, chlorine was 61 mass %, magnesium was 19 mass %, and DIBP was 12.5 mass %.

(2) Manufacturing of Prepolymerization Catalyst 100 g of the solid titanium catalyst component obtained by the method (1) described above, 131 mL of triethyl aluminum, 37.3 ml of diethyl aminotriethoxy silane, and 14.3 L of heptane were put into an autoclave provided with a stirrer of which the internal capacity was 20 L, 1000 g of propylene was put thereinto while retaining an internal temperature at 15° C. to 20° C., and was subjected to a reaction while being stirred for 120 minutes. After the polymerization ended, the solid component was precipitated, and the removal of the supernatant solution and the washing with heptane were performed two times. The obtained prepolymerization catalyst was resuspended in purified heptane, and adjustment was performed by using heptane such that the concentration of the solid catalyst component became 1.0 g/L.

(3) Main Polymerization

Propylene at 43 kg/hour, hydrogen at 256 NL/hour, the catalyst slurry obtained by the method (2) described above, as the solid catalyst component, at 0.49 g/hour, triethyl aluminum at 4.5 ml/hour, and diethyl aminotriethoxy silane at 1.8 ml/hour were continuously supplied to a recirculating tubular polymerization vessel provided with a jacket of which the internal capacity was 58 L, and polymerization was performed in a flooded state where a vapor phase did not exist. The temperature of the tubular polymerization vessel was 70° C., and the pressure thereof was 3.57 MPa/G.

The obtained slurry was transferred to a vessel-type polymerization vessel provided with a stirrer of which the internal capacity was 100 L, and the polymerization further performed. Propylene was supplied to the polymerization vessel at 45 kg/hour, and hydrogen was supplied to the polymerization vessel such that a hydrogen concentration of a vapor phase portion became 8.8 mol %. The polymerization was performed at a polymerization temperature of 68° C. and a pressure of 3.36 MPa/G.

The obtained slurry was transferred to a liquid transfer tube of which the internal capacity was 2.4 L, the slurry was gasified, and gas-solid separation was performed, and then, a polypropylene homopolymer powder was transferred to a vapor phase polymerization vessel of which the internal capacity was 480 L, and ethylene/propylene block copolymerization was performed. Propylene, ethylene, and hydrogen were continuously supplied such that a gas composition in the vapor phase polymerization vessel became ethylene/(ethylene+propylene)=0.20 (molar ratio) and hydrogen/ethylene=0.0031 (molar ratio). The polymerization was performed at a polymerization temperature of 70° C. and a pressure of 1.40 MPa/G.

A propylene•ethylene-based block copolymer (A1) obtained as described above was subjected to vacuum drying at 80° C. A melt flow rate (MFR) of the obtained propylene•ethylene-based block copolymer (A1) was 90 g/10 minutes, the content of a decane soluble component (a2) in the copolymer was 11 mass %, the content of a decane insoluble component (a1) was 89 mass %, a melt flow rate (MFR) of the decane insoluble component (a1) was 250 g/10 minutes, and an inherent viscosity [η] of the decane soluble component (a2) was 7.5 (dl/g). Furthermore, in a test piece of the propylene•ethylene-based block copolymer (A1) (a width of 10 mm and a thickness of 1 mm), an elongation viscosity was measured by using Rheometer MCR301 manufactured by Anton Paar Japan K.K., (170° C., Elongation Speed; 1/s, 10/s, 20/s, and 30/s), and as a result thereof, an obvious rise in the elongation viscosity with respect to an elongation time was not observed, and it was confirmed that strain hardening properties were not exhibited.

Example 1

76 mass % of the propylene•ethylene-based block copolymer (A1) obtained in the preparation example described above, 20 mass % of an ethylene•1-butene copolymer (EBR) (manufactured by Mitsui Chemicals, Inc., A350705) manufactured by a single site catalyst of which MFR (190° C., a load of 2.16 kg) was 35 g/10 minutes and the density was 0.86 g/cm$^3$, as the ethylene•α-olefin copolymer rubber (B), and 4 mass % of fine powder talc (an average particle diameter $D_{50}$ measured by a laser type particle size analyzer was 4.0 μm) as the inorganic filler (C) were granulated, and thus, a propylene-based resin composition was obtained. Next, an inorganic foaming agent master batch of a sodium bicarbonate system having a concentration of 50% (Polythlene EE515 manufactured by EIWA CHEMICAL IND. CO., LTD.) was subjected to dry blending such that a foaming agent component became 2.5 parts by mass with respect to 100 parts by mass of the obtained propylene-based resin composition. Next, the obtained composition was put into a hopper of an injection molding machine, and was subjected to injection foam molding in conditions described below, and thus, a foamed molded body was obtained.

Device
Injection Molding Machine: an injection molding machine of 350 t
Metal Mold: a rectangular plate metal mold of 400×200 (a center one-point direct gate)
Cavity Initial Thickness: 0.7 mm, (an initial thickness was a cavity surface interval between a fixed metal mold and a movable metal mold before being filled with the resin composition)
Cavity Material: SCM steel
Foam Molding Conditions
Injection Temperature: 210° C.
Metal Mold Temperature: 40° C.
Injection Rate: 239 cm$^3$/second
Initial Filling Thickness: 0.7 mm
Cavity Surface Interval between Fixed Metal Mold and Movable Metal Mold after Foaming Step Ended: 3.0 mm Example 2

In Example 1, a core-backing amount increased, the cavity surface interval between the fixed metal mold and the movable metal mold after the foaming step ended was set to 3.9 mm, and molding was performed, and thus, evaluation was performed.

Example 3

In Example 2, a nest (200×100) in which a PET film having a thickness of 0.025 mm and thermal conductivity of 0.24 W/m·K was bonded onto a surface was exchanged with a part of the metal mold, and molding was performed, and thus, evaluation was performed.

Example 4

In Example 2, a nest (200×100) of which the surface was coated with alumina ceramic with a thickness of 0.3 mm and thermal conductivity of 32 W/m·K was exchanged with a part of the metal mold, and molding was performed, and thus, evaluation was performed.

Example 5

In Example 2, the initial cavity interval was changed to 1.0 mm, a filling amount of the resin composition increased to the equivalence of 1.0 mm, and molding was performed, and thus, evaluation was performed.

Example 6

In Example 5, a core-backing amount increased, the cavity surface interval between the fixed metal mold and the movable metal mold after the foaming step ended was set to 5.0 mm, and molding was performed, and thus, evaluation was performed.

Example 7

74 mass % of the propylene•ethylene-based block copolymer (A1) obtained in the preparation example described above, 24 mass % of an ethylene•1-octene copolymer (EOR) (ENGAGE8407 manufactured by The Dow Chemical Company) manufactured by a single site catalyst of which MFR (190° C., a load of 2.16 kg) was 30 g/10 minutes and the density was 0.87 g/cm$^3$, as the ethylene•α-olefin copolymer rubber (B), and 2 mass % of fine powder talc (an average particle diameter $D_{50}$ measured by a laser type particle size analyzer was 4.0 μm) as the inorganic filler (C) were granulated, and thus, a propylene-based resin composition was obtained. Next, an inorganic foaming agent master batch of a sodium bicarbonate system having a concentration of 40% (Polythlene EE65C manufactured by EIWA CHEMICAL IND. CO., LTD.) was subjected to dry blending such that a foaming agent component became 2.0 parts by mass with respect to 100 parts by mass of the obtained propylene-based resin composition. Next, the obtained composition was put into a hopper of an injection molding machine, and was subjected to injection foam molding in conditions described below, and thus, a foamed molded body was obtained.

Device
Injection Molding Machine: an injection molding machine of 850 t
Metal Mold: a rectangular plate metal mold of 800×500 (provided with a hot runner and a valve gate)
Gate: a two-point gate was used (a region of 400×500 mm per one gate was filled)

A cavity initial thickness was set to 1.2 mm (an initial thickness was a cavity surface interval between a fixed metal mold and a movable metal mold before being filled with the resin composition), the opening and closing of the valve gate was set such that the opening was performed at the start of injection and the closing was performed at the end of the injection.

Foam Molding Conditions
Injection Temperature: 195° C.
Metal Mold Temperature: 40° C.
Injection Rate: 1380 cm$^3$/second
Initial Filling Thickness: 1.2 mm
Cavity Surface Interval between Fixed Metal Mold and Movable Metal Mold after Foaming Step Ended: 2.5 mm Example 8

In Example 7, a core-backing amount increased, the cavity surface interval between the fixed metal mold and the movable metal mold after the foaming step ended was set to 3.0 mm, and molding was performed, and thus, evaluation was performed.

Example 9

In Example 7, the core-backing amount increased, the cavity surface interval between the fixed metal mold and the movable metal mold after the foaming step ended was set to 5.0 mm, and molding was performed, and thus, evaluation was performed.

Example 10

In Example 7, the initial thickness was set to 1.4 mm, the cavity surface interval between the fixed metal mold and the movable metal mold after the foaming step ended was set to 3.0 mm, and molding was performed, and thus, evaluation was performed.

Example 11

In Example 10, the cavity surface interval between the fixed metal mold and the movable metal mold after the foaming step ended was set to 6.0 mm, and molding was performed, and thus, evaluation was performed.

Example 12

The same molding as that in Example 7 was performed except that a propylene-based resin composition obtained by granulating 76 mass % of the propylene•ethylene-based block copolymer (A1), and 24 mass % of an ethylene•1-octene copolymer (EOR) (ENGAGE8407 manufactured by The Dow Chemical Company) manufactured by a single site catalyst of which MFR (190° C., a load of 2.16 kg) was 30 g/10 minutes and the density was 0.87 g/cm$^3$, as the ethylene•α-olefin copolymer rubber (B) was used, the initial thickness was set to 1.4 mm, and the cavity surface interval between the fixed metal mold and the movable metal mold after the foaming step ended was set to 3.5 mm, and thus, evaluation was performed.

Comparative Example 1

In Example 1, the initial thickness was set to 0.6 mm, and molding was performed, and thus, evaluation was performed. The molded body in the vicinity of the gate was foamed, but the plate thickness of the molded body was not sufficient, and thus, the bending rigidity of the molded body was low, and a recess or plate thickness unevenness was generated on the surface in the vicinity of the end due to an unfoamed portion, a foamed shortage, or the like.

Comparative Example 2

In Example 1, the cavity surface interval between the fixed metal mold and the movable metal mold after the foaming step ended was set to 2.5 mm, and molding was performed, and thus evaluation was performed. Foaming unevenness was not generated in the molded body, but the plate thickness was insufficient, and thus, the bending rigidity of the molded body was low.

Comparative Example 3

In Example 5, the cavity surface interval between the fixed metal mold and the movable metal mold after the foaming step ended was set to 2 mm, and molding was performed, and thus, evaluation was performed. The foaming unevenness was not generated in the molded body, but the plate thickness was insufficient, and thus, the bending rigidity of the molded body was low.

Comparative Example 4

In Example 5, the cavity surface interval between the fixed metal mold and the movable metal mold after the foaming step ended was set to 6.5 mm, and molding was performed, and thus, evaluation was performed. A cell state of the foamed portion of the molded body was in an open-cell state where a part of a cell wall was broken. As a result thereof, a partial recess was generated on the surface of the molded body.

Comparative Example 5

In Example 7, the cavity surface interval between the fixed metal mold and the movable metal mold after the foaming step ended was set to 2 mm, and molding was performed, and thus, evaluation was performed. The foaming unevenness was not generated in the molded body, but the plate thickness was insufficient, and thus, the bending rigidity of the molded body was low, and the thermal resistance value was also low.

Comparative Example 6

In Example 7, the cavity surface interval between the fixed metal mold and the movable metal mold after the foaming step ended was set to 6.5 mm, and molding was performed, and thus, evaluation was performed. A cell state of the foamed portion of the molded body was in an open-cell state where a part of a cell wall was broken. As a result thereof, a partial recess was generated on the surface of the molded body.

Comparative Example 7

In Example 10, the cavity surface interval between the fixed metal mold and the movable metal mold after the foaming step ended was set to 2.2 mm, and molding was performed, and thus, evaluation was performed. The foaming unevenness was not generated in the molded body, and the rigidity of the molded body was also sufficient, but the thermal resistance value was low.

Comparative Example 8

In Example 11, the initial thickness was 1.5 mm, the cavity surface interval between the fixed metal mold and the movable metal mold after the foaming step ended was set to 7.0 mm, and molding was performed, and thus, evaluation was performed. The rigidity of the molded body was sufficient, and the thermal resistance value was also sufficient, but the foaming unevenness started to be generated in the molded body, and the state of a part of the cell also tended to be in an open-cell state, and thus, coarsening was performed. In addition, the thermal capacity per unit area was also high.

Comparative Example 9

In Example 11, the initial thickness was 1.8 mm, the cavity surface interval between the fixed metal mold and the movable metal mold after the foaming step ended was set to 3.0 mm, and molding was performed, and thus, evaluation was performed. The foaming unevenness was not generated in the molded body, the rigidity of the molded body was also sufficient, and the thermal resistance value was also sufficient, but there were many swirl marks on the surface of the molded body. The thickness of the skin layer was thick by 0.6 mm, and thus, the surface impact energy was sufficiently high, but the thermal capacity per unit area was a high value to the extent of greater than 2.5 kJ/m$^2$·K.

TABLE 1

|  | (Unit) | Example 1 | Example 2 | Example 3 | Example 4 | Example 5 | Example 6 | Example 7 |
|---|---|---|---|---|---|---|---|---|
| Substantial Thickness | [mm] | 0.7 | 0.7 | 0.7 | 0.7 | 1.0 | 1.0 | 1.2 |
| Thickness of Foamed Molded Body | [mm] | 3.0 | 3.9 | 4.0 | 3.9 | 3.0 | 5.0 | 2.5 |
| Thickness of Skin Layer | [mm] | 0.2 | 0.2 | 0.2 | 0.2 | 0.3 | 0.3 | 0.4 |
| Bending Rigidity | [N · m$^2$/m] | 0.60 | 0.99 | 1.09 | 1.04 | 0.86 | 2.40 | 0.63 |
| Thermal Capacity | [kJ/m$^2$ · K] | 1.2 | 1.2 | 1.2 | 1.2 | 1.7 | 1.7 | 2.0 |
| Thermal Resistance | [m$^2$ · K/W] | 0.052 | 0.077 | 0.082 | 0.079 | 0.041 | 0.095 | 0.025 |
| Satisfying Expression 1 |  | B | B | B | B | B | B | B |
| Foaming Ratio | [—] | 4.3 | 5.5 | 5.8 | 5.6 | 3.0 | 5.0 | 2.1 |
| Cavity Material | — | SCM Steel | SCM Steel | PET | Ceramic | SCM Steel | SCM Steel | SCM Steel |
| Density | [g/cm$^3$] | 0.22 | 0.17 | 0.16 | 0.17 | 0.31 | 0.19 | 0.45 |
| Surface Impact Energy (HRIT, 23° C.) | [J] | 3.5 | 4 | 4.2 | 4 | 5 | 6 | 6 |
| Cell State | — | B | B | B | B | B | B | B |
| Appearance | — | B | B | A | B | B | B | B |

TABLE 2

|  | (Unit) | Example 8 | Example 9 | Example 10 | Example 11 | Example 12 | Comparative Example 1 | Comparative Example 2 | Comparative Example 3 |
|---|---|---|---|---|---|---|---|---|---|
| Substantial Thickness | [mm] | 1.2 | 1.2 | 1.4 | 1.4 | 1.4 | 0.6 | 0.7 | 1.0 |
| Thickness of Foamed Molded Body | [mm] | 3.0 | 5.0 | 3.0 | 6.0 | 4.0 | 3.0 | 2.5 | 2.0 |
| Thickness of Skin Layer | [mm] | 0.4 | 0.4 | 0.5 | 0.4 | 0.4 | 0.2 | 0.2 | 0.4 |
| Bending Rigidity | [N · m$^2$/m] | 0.90 | 2.50 | 1.05 | 4.20 | 1.77 | 0.40 | 0.32 | 0.29 |
| Thermal Capacity | [kJ/m$^2$ · K] | 2.0 | 2.0 | 2.4 | 2.4 | 2.4 | 1.0 | 1.2 | 1.7 |
| Thermal Resistance | [m$^2$ · K/W] | 0.036 | 0.085 | 0.031 | 0.104 | 0.053 | 0.057 | 0.039 | 0.020 |
| Satisfying Expression 1 |  | B | B | B | B | B | C | C | C |
| Foaming Ratio | [—] | 2.5 | 4.2 | 2.1 | 4.3 | 2.9 | 5.0 | 3.6 | 2.0 |
| Cavity Material | — | SCM Steel | SCM Steel | SCM Steel | SCM Steel | SCM Steel | SCM Steel | SCM Steel | SCM Steel |
| Density | [g/cm$^3$] | 0.37 | 0.22 | 0.43 | 0.22 | 0.31 | Uneven | 0.26 | 0.47 |
| Surface Impact Energy (HRIT, 23° C.) | [J] | 6 | 7 | 7 | 9 | 7 | 3 | 3 | 4 |
| Cell State | — | B | B | B | B | B | B | B | B |
| Appearance | — | B | B | B | B | B | C | B | B |

TABLE 3

|  | (Unit) | Comparative Example 4 | Comparative Example 5 | Comparative Example 6 | Comparative Example 7 | Comparative Example 8 | Comparative Example 9 |
|---|---|---|---|---|---|---|---|
| Substantial Thickness | [mm] | 1.0 | 1.2 | 1.2 | 1.4 | 1.5 | 1.8 |
| Thickness of Foamed Molded Body | [mm] | 6.2 | 2.0 | 7.5 | 2.2 | 7.0 | 3.0 |
| Thickness of Skin Layer | [mm] | 0.3 | 0.4 | 0.3 | 0.5 | 0.5 | 0.6 |
| Bending Rigidity | [N · m²/m] | 1.84 | 0.40 | 1.41 | 0.56 | 2.04 | 1.35 |
| Thermal Capacity | [kJ/m² · K] | 1.7 | 2.0 | 2.0 | 2.4 | 2.5 | 3.0 |
| Thermal Resistance | [m² · K/W] | 0.131 | 0.017 | 0.159 | 0.017 | 0.127 | 0.025 |
| Satisfying Expression 1 |  | B | B | B | B | B | B |
| Foaming Ratio | [—] | 6.2 | 1.7 | 6.3 | 1.6 | 4.7 | 1.7 |
| Cavity Material | — | SCM Steel | SCM Steel | SCM Steel | SCM Steel | SCM Steel | SCM Steel |
| Density | [g/cm³] | Uneven | 0.56 | Uneven | 0.59 | Uneven | 0.56 |
| Surface Impact Energy (HRIT, 23° C.) | [J] | 3 | 5 | 3 | 6 | 5 | 9 |
| Cell State | — | C | B | C | B | C | B |
| Appearance | — | C | B | C | B | C | C |

Japanese Patent Application No. 2014-221651, filed on Oct. 30, 2014, and the entire disclosure thereof is incorporated herein.

The invention claimed is:

1. A polypropylene-based foamed molded body, molded in an injection molding machine wherein the initial plate thickness of the molding cavity is greater than or equal tom 0.7 mm and less than 1.5 mm, wherein a density which is measured on the basis of ISO1183 is greater than or equal to 0.15 g/cm³ and less than or equal to 0.54 g/cm³, thermal resistance (R) at 30° C. in a thickness direction which is measured on the basis of ASTM E1530 is greater than or equal to 0.020 m²·K/W and less than or equal to 0.125 m²·K/W, thermal capacity per unit area (Q) at 30° C. is greater than or equal to 1.0 kJ/m²·K and less than or equal to 2.5 kJ/m²·K, and Expression 1 described below is satisfied, wherein the polypropylene-based foamed molded body contains only a propylene ethylene-based block copolymer (A) and ethylene α-olefin copolymer rubber (B) as a resin component, and wherein the propylene ethylene-based block copolymer (A) includes a propylene homopolymer portion and an ethylene•propylene random copolymer portion, and MFR (230° C., a load of 2.16 kg) of the propylene homopolymer portion is greater than or equal to 50 g/10 minutes, $$Q>1/(4\times R^{1/2})$$ (Expression 1)

wherein a substantial thickness ($t_0$) of the polypropylene-based foamed molded body which is defined by Expression 2 described below is greater than or equal to 0.7 mm and less than 1.5 mm, $$t_0 \text{ (mm)}=10\times W/(D_0\times S)$$ (Expression 2)

in Expression 2, W indicates a mass (g) of a plate-like foamless test piece which is defoamed and is obtained by defoaming a square plate-like test piece cut out from the polypropylene-based foamed molded body at 200° C. under reduced pressure, and then, by performing a pressurized slow cooling treatment, $D_0$ indicates a density (g/cm³) of the obtained foamless test piece, and S indicates an area (cm²) of one surface of the square plate-like test piece cut out from the polypropylene-based foamed molded body, and, wherein a foaming ratio of the polypropylene-based foamed molded body is greater than or equal to 2.1 times.

2. The polypropylene-based foamed molded body according to claim 1, wherein at least a part of the polypropylene-based foamed molded body includes a flat portion, and bending rigidity per unit width in the flat portion is greater than or equal to 0.40 N·m²/m.

3. The polypropylene-based foamed molded body according to claim 1, wherein a first solid skin layer, a foamed layer, and a second solid skin layer are in a state of being laminated in this order.

4. The polypropylene-based foamed molded body according to claim 3, wherein a thickness of the polypropylene-based foamed molded body is greater than or equal to 2.0 mm and less than or equal to 7.0 mm, and thicknesses of the first solid skin layer and the second solid skin layer are respectively greater than or equal to 0.1 mm and less than or equal to 0.5 mm.

5. The polypropylene-based foamed molded body according to claim 1, wherein when a total of the propylene•ethylene-based block copolymer (A), the ethylene•α-olefin copolymer rubber (B), and an inorganic filler (C) is set to 100 parts by mass, a content of the propylene•ethylene-based block copolymer (A) is greater than or equal to 65 parts by mass and less than or equal to 90 parts by mass, a content of the ethylene•α-olefin copolymer rubber (B) is greater than or equal to 10 parts by mass and less than or equal to 30 parts by mass, and a content of the inorganic filler (C) is greater than or equal to 0 parts by mass and less than or equal to 5 parts by mass.

6. A polypropylene-based foamed molded body of claim 1 wherein the a propylene ethylene-based block copolymer (A) and ethylene α-olefin copolymer rubber (B) have a foaming ratio that is greater than 3.1.

7. A manufacturing method for manufacturing the polypropylene-based foamed molded body according to claim 1, comprising:

a step of performing foam molding with respect to a propylene-based resin composition containing a propylene•ethylene-based block copolymer (A), ethylene•α-olefin copolymer rubber (B), and an inorganic filler (C); and a step of further adding a foaming agent (D) to the polypropylene-based resin composition before performing the foam molding or at the time of performing the foam molding, wherein when a total of the propylene•ethylene-based block copolymer (A), the ethylene•α-olefin copolymer rubber (B), and the inorganic filler (C) is set to 100 parts by mass, a formulation amount of the propylene•ethylene-based block copolymer (A) is greater than or equal to 65 parts by mass and less than or equal to 90 parts by mass, a formulation amount of the ethylene•α-olefin copolymer rubber (B) is greater than or equal to 10 parts by mass and less than or equal to 30 parts by mass, a formulation amount of the inorganic filler (C) is greater than or equal to 0 parts by mass and less than or equal to 5 parts by mass, and a formulation amount of the foaming agent (D) is greater than or equal to 0.8 parts by mass and less than or equal to 4.0 parts by mass.

8. The manufacturing method of a polypropylene-based foamed molded body according to claim 7, wherein a melt flow rate (MFR) (230° C., a load of 2160 g) of the propylene ethylene-based block copolymer (A) which is measured on the basis of ASTM D-1238 is greater than or equal to 50 g/10 minutes and less than or equal to 140 g/10 minutes.

9. The manufacturing method of a polypropylene-based foamed molded body according to claim 7, wherein an inherent viscosity of an ethylene propylene random copolymer portion configuring the propylene ethylene-based block copolymer (A) which is measured at 135° C. in decahydronaphthalene is greater than 5 dl/g and less than or equal to 9 dl/g.

10. The manufacturing method of a polypropylene-based foamed molded body according to claim 7, wherein the foaming agent (D) is a thermally decomposable foaming agent containing at least one type selected from carbonate and hydrogen carbonate.

11. The manufacturing method of a polypropylene-based foamed molded body according to claim 7, wherein in the step of performing the foam molding with respect to the propylene-based resin composition, the polypropylene-based resin composition is subjected to injection foam molding by using an injection molding machine, and when a cavity clearance of a metal mold at the time of starting injection is set to $T_0$, and a length of a sectional surface of a cavity in an enlarging and opening direction after retracting a movable mold of the metal mold is set to $T_1$, $T_0$ is set to be greater than or equal to 0.7 mm and less than 1.5 mm, and $T_1/T_0$ is set to be greater than or equal to 1.8 and less than or equal to 6.0.

12. The manufacturing method of a polypropylene-based foamed molded body according to claim 11, wherein a temperature of the polypropylene-based resin composition at the time of performing the injection with respect to the polypropylene-based resin composition is higher than or equal to 170° C. and lower than or equal to 250° C., temperatures of a fixed mold and the movable mold of the metal mold at the time of performing the injection are higher than or equal to 25° C. and lower than or equal to 80° C., an injection rate of the injection molding machine is greater than or equal to 100 cm³/second and less than or equal to 2000 cm³/second, an injection pressure of the injection molding machine is greater than or equal to 70 MPa and less than or equal to 200 MPa, a time from completion of injection filling to start of retracting the movable mold is longer than 0 seconds and shorter than or equal to 5 seconds, and a foaming ratio is greater than or equal to 1.8 times and less than or equal to 6.0 times.

13. The manufacturing method of a polypropylene-based foamed molded body according to claim 11, wherein a heat insulating layer having thermal conductivity of greater than or equal to 0.18 W/m·K and less than or equal to 40 W/m·K is formed over one surface or both surfaces of the cavity of the metal mold to have a thickness of greater than or equal to 0.01 mm and less than or equal to 0.5 mm.

14. A polypropylene-based foamed molded body, wherein a density which is measured on the basis of ISO1183 is greater than or equal to 0.15 g/cm³ and less than or equal to 0.54 g/cm³, molded in an injection molding machine wherein the initial plate thickness of the molding cavity is greater than or equal to 0.7 mm and less than 1.5 mm, thermal resistance (R) at 30° C. in a thickness direction which is measured on the basis of ASTM E1530 is greater than or equal to 0.020 m² K/W and less than or equal to 0.125 m² K/W, thermal capacity per unit area (Q) at 30° C. is greater than or equal to 1.0 kJ/m² K and less than or equal to 2.5 kJ/m² K, and Expression 1 described below is satisfied, wherein the polypropylene-based foamed molded body contains only a propylene ethylene-based block copolymer (A) and ethylene α-olefin copolymer rubber (B) as a resin component, and wherein the proplene ethylene-based block copolymer (A) includes a propylene homopolymer portion and an ethylene propylene random copolymer portion, and MFR (230° C., a load of 2.16 kg) of the propylene homopolymer portion is greater than or equal to 50 g/10 minutes, wherein the polypropylene-based foamed molded body is an interior component of an automobile, $$Q > 1/(4 \times R^{1/2})$$ (Expression 1)

wherein a substantial thickness (to) of the polypropylene-based foamed molded body which is defined by Expression 2 described below is greater than or equal to 0.7 mm and less than 1.5 mm, $$t_0 \text{ (mm)} = 10 \times W/(D_0 \times S) \quad \text{(Expression 2)}$$

in Expression 2, W indicates a mass (g) of a plate-like foamless test piece which is defoamed and is obtained by defoaming a square plate-like test piece cut out from the polypropylene-based foamed molded body at 200° C. under reduced pressure, and then, by performing a pressurized slow cooling treatment, $D_0$ indicates a density (g/cm$^3$) of the obtained foamless test piece, and S indicates an area (cm$^2$) of one surface of the square plate-like test piece cut out from the polypropylene-based foamed molded body, and, wherein a foaming ratio of the polypropylene-based foamed molded body is greater than or equal to 2.1 times.

15. A polypropylene-based foamed molded body, wherein a density which is measured on the basis of ISO1183 is greater than or equal to 0.15 g/cm$^3$ and less than or equal to 0.54 g/cm$^3$, molded in an injection molding machine wherein the initial plate thickness of the molding cavity is greater than or equal to 0.7 mm and less than 1.5 mm, thermal resistance (R) at 30° C. in a thickness direction which is measured on the basis of ASTM E1530 is greater than or equal to 0.020 m$^2$·K/W and less than or equal to 0.125 m$^2$·K/W, thermal capacity per unit area (Q) at 30° C. is greater than or equal to 1.0 kJ/m$^2$·K and less than or equal to 2.5 kJ/m$^2$·K, and Expression 1 described below is satisfied, wherein the polypropylene-based foamed molded body contains only a propylene•ethylene-based block copolymer (A) and ethylene•α-olefin copolymer rubber (B) as a resin component, and wherein the propylene•ethylene-based block copolymer (A) includes a propylene homopolymer portion and an ethylene•propylene random copolymer portion, and MFR (230° C., a load of 2.16 kg) of the propylene homopolymer portion is greater than or equal to 50 g/10 minutes, wherein the polypropylene-based foamed molded body is a door trim of an automobile, $$Q > 1/(4 \times R^{1/2}) \quad \text{(Expression 1)}$$

wherein a substantial thickness (to) of the polypropylene-based foamed molded body which is defined by Expression 2 described below is greater than or equal to 0.7 mm and less than 1.5 mm, $$t_0 \text{ (mm)} = 10 \times W/(D_0 \times S) \quad \text{(Expression 2)}$$

in Expression 2, W indicates a mass (g) of a plate-like foamless test piece which is defoamed and is obtained by defoaming a square plate-like test piece cut out from the polypropylene-based foamed molded body at 200° C. under reduced pressure, and then, by performing a pressurized slow cooling treatment, $D_0$ indicates a density (g/cm$^3$) of the obtained foamless test piece, and S indicates an area (cm$^2$) of one surface of the square plate-like test piece cut out from the polypropylene-based foamed molded body, and wherein a foaming ratio of the polypropylene-based foamed molded body is greater than or equal to 2.1 times.

* * * * *